United States Patent
Suzuki

(10) Patent No.: US 7,855,781 B2
(45) Date of Patent: Dec. 21, 2010

(54) OPTICAL DEVICE

(75) Inventor: Yuichi Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 220 days.

(21) Appl. No.: 12/213,795

(22) Filed: Jun. 24, 2008

(65) Prior Publication Data

US 2008/0316479 A1   Dec. 25, 2008

(30) Foreign Application Priority Data

Jun. 25, 2007   (JP) .............................. 2007-166683

(51) Int. Cl.
*G01N 21/00* (2006.01)
(52) U.S. Cl. ..................................... 356/73.1
(58) Field of Classification Search .................. None
See application file for complete search history.

(56) References Cited

U.S. PATENT DOCUMENTS

2002/0071627 A1 * 6/2002 Smith et al. .................. 385/15
2002/0094187 A1 * 7/2002 Barrett ....................... 385/140
2005/0213978 A1   9/2005 Yamashita et al.

FOREIGN PATENT DOCUMENTS

| JP | 5-158083 | 6/1993 |
|---|---|---|
| JP | 2003-185866 | 7/2003 |
| JP | 2004-117449 | 4/2004 |
| JP | 2005-283932 | 10/2005 |

OTHER PUBLICATIONS

Senichi Suzuki, "Photonic Devices Based on Arrayed-Waveguide Gratings", *The Journal of the Institute of Electronics Information and Communication Engineers*, vol. 82, No. 7, pp. 746-752, Jul. 1999.

* cited by examiner

*Primary Examiner*—Tu T Nguyen
(74) *Attorney, Agent, or Firm*—Staas & Halsey LLP

(57) ABSTRACT

According to an aspect of the embodiment, an optical device has a mirror device having a plurality of mirrors which are able to move, and a mirror interface for adjusting light axis of the each input light in accordance with each position of the mirrors.

7 Claims, 18 Drawing Sheets

FOCAL POINT CHENGED BY ENVIRONMENTAL TEMPRATUR

OPTICAL DEVICE

CROSS-REFERENCE TO RELATED APPLICATION

This application is based upon and claims the benefit of priority of the prior Japanese Patent Application No. 2007-166683, filed on Jun. 25, 2007, the entire contents of which are incorporated herein by reference.

BACKGROUND

1. Field

The present invention relates to an optical device. For example, the optical device relates to an optical switch that which is suitable for a wavelength division multiplexing (WDM) transmission system.

2. Description of the Related Art

Recently, in order to process rapidly increasing amounts of traffic data on the Internet, optical networks and optical interfacing using the wavelength division multiplexing (WDM) as their nucleus are being constructed at a high pace. The current network (WD transmission system) configuration has been developed from the point-to-point type network configuration in which two base stations (transmission terminal station devices) are directly connected, into the ring type or mesh type network configuration.

Hitherto, the channel switching, multiplexing (ADD), or demultiplexing (DROP) of optical signals in an optical transmission device has been performed by the electrical switching with respect to electric signals that have been converted from optical signals. However, the optical switch using the wavelength selective switch (WSS) for directly switching optical signals allows switching without converting optical signals into electric signals, to thereby enable an increase in the switching speed, and dynamic setting or change of routes. With this being the case, the provision of the WSS to the channel switching or the like has been studied in recent years.

The optical switch using the WSS plays a role also in reducing the module mounting area in a unit or the cost reduction. Such an optical switch can individually changes routes of single-wavelength light beams included in inputted wavelength multiplexed signal light, and again wavelength-multiplex the changed n-single wavelength light beams and output them as required. Here, the wavelength of each single-wavelength light beam is prescribed by specifications referred to as IUT grid, standardized by the ITU (International Telecommunication Union), so as to conform to this IUT grid.

Regarding the constructions of conventional WSSs, because many of them use diffraction gratings, they need to earn dispersion in order to obtain a desired property, leading to an increase in an optical path length. This results in an increased module size. In order to downsize the WSS, therefore, spectroscopic elements with a large dispersion become indispensable. One method for increasing dispersion is to apply optical waveguides to the spectroscopic elements. Use of the optical waveguide allows an optical path difference to be made by the core pattern of the optical waveguide, thereby enabling a diffraction order to be freely selectable. For example, in arrayed waveguide gratings (AWG) constituting a typical optical waveguide type demultiplexing device, ones having diffraction orders ranging from about 12 to about 74 have been realized (refer to the following patent document 1). Because the dispersion of the AWG is proportional to the diffraction order, a large diffraction order allows spectroscopic elements with large dispersion to be realized, thereby enabling size-reduction.

Related techniques are discussed in the following documents. The Japanese Laid-open Patent Publication No. 2005-283932 describes wavelength selective switches using MEMS mirrors, and the Japanese Laid-open Patent Publication No. 2004-117449 and Japanese Patent No. 2986031 each describe a waveguide type wavelength selective switch. Japanese Laid-open Patent Publication No. 2003-185866 sets forth a construction example in which a photodiode is mounted on a waveguide.

Because the WSS is an optical device functioning in accordance with a signal wavelength, it is desired that the signal interval is a constant wavelength interval. However, the ITU prescribes that the signal light interval is a frequency interval 100 GHz (or 50 GHz), and therefore, when this frequency interval is converted into a wavelength interval, the interval does not become constant, and focus images of light beams for each channel, demultiplexed by the demultiplexing elements serving as the WSSs become unequally spaced. In this case, if optical routes for each channel are switched using equally spaced MEMS mirrors, reflecting surfaces (focus images) with respect to the mirrors differ with each other, so that there occurs a problem of causing deterioration of pass bands, or leading to an occurrence of variations in the pass bands for each wavelength.

A possible method for inhibiting such an occurrence of variations in pass bands is one in which the unequal wavelength interval is converted into an equal interval by exercising one's ingenuity to the construction of the MEMS mirror or the like, or by using a wedge-shaped prism. However, in the former case, since it is necessary to design the MEMS mirrors to be unequally spaced so as to become optimal with respect to each wavelength, the difficulty level of the design is increased, so that the MEMS mirrors become specialty items. This leaves room for improvement in general versatility. In the latter case, since the prism is additionally arranged as a new optical member, insertion loss increases, and in addition, a workload for the adjustment of the alignment of an optical system, or the difficulty level of assembly increases, which can result in an increased number of man-hours for work.

Suzuki, "Allayed Waveguide Diffraction Grating (AWG) Device", the Journal of the Institute of Electronics, Information and Communication Engineers, Vol. 82, No. 7, pp. 746 to 752 (1999) discusses a technique for solving the above-described problems.

The WSS is expected to be used for a node having an OADM (optical add drop multiplexer) function and an OCX (optical cross-connect) function in a ring-type or mesh-type construction that is supposed to become the next generation of network configuration. In this case, for a function of an optical device installed on the node described above, it is expected to allow, not only information on the light power, but also information on the wavelength number and the wavelength allocation to be obtained as monitor information on signal light, regarding light outputted from each port.

In order to monitor light outputted from each port, a construction is supposed that takes out a part of light outputted from the port by branching it with a tap coupler or the like, and that monitors the light power, the wavelength allocation or the like for each wavelength component, using a simplified spectrum analyzer. However, there arises a need to form a module for an optical monitor at the outside of the port, separated from the construction as the wavelength selective switch. Especially when using monitoring results for the control of mirror angles of the MEMS mirrors, communications between modules must be performed, so that a circuit construction such as ICs for communication is supposed to have to be separately provided. This leaves room for improvement in reducing the apparatus scale.

Another possible construction stores in advance information on the attenuation amounts of output light with respect to the angle variation amounts of light reflecting elements such as the MEMS mirrors, and performs optical level corrections (adjustments) through the control of reflecting surface angles of the MEMS mirrors, to thereby realize VOA function control. Specifically, this construction records information on the angle variation amounts of the MEMS mirrors, and correction information on the temperature characteristics of the angle variation amounts, in a memory of a digital signal processor (DSP) or the like, to thereby move the MEMS mirrors by the angle recorded in accordance with a set attenuation amount. However, the angle control for the MEMS mirrors is not easy to perform at a high degree of accuracy, and in addition, it has a possibility of deteriorating over time, thereby raising concerns for long-term reliability. Therefore, regarding the angles of the MEMS mirrors, the function of performing feedback control in response to light amounts is an important matter under the current circumstances.

In the patent document 1, regarding the wavelength selective switch, a construction is disclosed wherein a plurality of single-wavelength light beams that are switched in routes for each wavelength are multiplexed to thereby output them as second wavelength multiplexed light, and wherein a part of the second wavelength multiplexed light is branched, as well as the branched light is demultiplexed for each wavelength component, and physical amounts of respective demultiplexed light beams are monitored. However, since this construction adopts a redundant arrangement so as to again demultiplex the second wavelength multiplexed light, it hinders the reduction in insertion loss, the cutback of the number of components, and the decrease in mounting area.

Accordingly, the present invention is characterized by the following mirror unit and optical switch.

(1) That is, the mirror unit according to the present invention is characterized by comprising a mirror device in which a plurality of movable mirrors are provided at equal intervals; and interfaces that perform optical axis corrections such that each reflection target light beam to be made to be reflected on a respective one of the plurality of movable mirrors has an optical axis corresponding to the installation position of the respective one of the movable mirrors, whereupon the interfaces introduce each of the reflection target light beams into the respective one of the movable mirror.

(2) The optical switch according to the present invention is a switch including a plurality of optical ports into/from which light beams are inputted/outputted, and switching the light beams outputted through the optical ports in wavelength units, characterized by comprising spectroscopic elements that spectrally separate light beams inputted from the optical ports and outputs them as light beams with optical axes different for each wavelength; a mirror device in which a plurality of movable mirrors are arranged at equal intervals, which causes respective light beams for each wavelength outputted from the spectroscopic elements to reflect, and which allows the optical ports of output destinations to be switched by making the angles of the reflecting surfaces variable; and a plurality of mirror interfaces each provided on the optical paths between the movable mirrors and the plurality of optical ports mediated by the spectroscopic elements, wherein light beams that have been spectrally separated by the spectroscopic elements and that have optical axes different for each wavelength are inputted into the mirror interfaces, and the mirror interfaces subject the light beams to an optical axis corrections such that each of the input light beams has an optical axis corresponding to the installation position of the movable mirror for causing one of the respective one of the wavelength lights to reflect, whereupon the mirror interfaces introduce each of the input light beam into the respective one of the movable mirror.

(3) Furthermore, in the above (2), each of the mirror interfaces may include a substrate; and a plurality of correction waveguides that is formed on the substrate, that have reflection target light beams inputted from one end face of the substrate, and that perform optical axis corrections such that the inputted reflection target light beams have optical axes corresponding to the installation positions of the respective plurality of movable mirrors, wherein the light beams that have propagated through the optical axis correction waveguides may be emitted from the other end face of the substrate to the respective movable mirrors.

(4) Moreover, in the above (2), the spectroscopic elements are a plurality of arrayed waveguide devices provided in correspondence with the respective plurality of optical ports, and each of the arrayed waveguide devices may include a substrate; and an AWG (arrayed waveguide gratings) waveguide that has a plurality of output waveguides formed on the substrate through which the spectrally separated light beams by wavelength each propagate, wherein the plurality of mirror interfaces may be integrally formed with the plurality of arrayed waveguide grating devices provided in correspondence with the respective plurality of optical ports, and wherein each of the mirror interfaces may include the substrate constituting the corresponding arrayed waveguide grating devices; and a plurality of correction waveguides that are formed on the substrate, that are connected to the respective plurality of output waveguides constituting the AWG waveguides, and that perform interval corrections such as to cause the intervals of the plurality of output waveguides to correspond to the installation intervals of the plurality of movable mirrors.

Furthermore, in the above (3) or (4), a light receiving element that monitors light propagating through a corresponding correction waveguide may be mounted on the installation position of each of the plurality of correction waveguides in the mirror interface, and in addition, a control unit for controlling the reflecting surface angles in the movable mirrors in response to monitoring results in the light receiving element may be provided.

SUMMARY

Accordingly, it is an object of the embodiment of the present invention to deteriorate of pass bands or variations in pass bands for each wavelength in optical device.

According to an aspect of the embodiment, an optical device having a mirror device having a plurality of mirrors which are able to move, and a mirror interface for adjusting light axis of the each input light in accordance with each position of the mirrors.

Additional objects and advantages of the embodiment will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF THE PREFERRED EMBODIMENT

Hereinafter, embodiments according to the present invention will be described with reference to drawings.

The present invention is not limited to the following embodiments. Other than the above-described objects of this application, other technical problems, means for solving the technical problems, and effects will be clarified by the disclosure by the following embodiments.

[A] Description of First Embodiment

Figure 1:
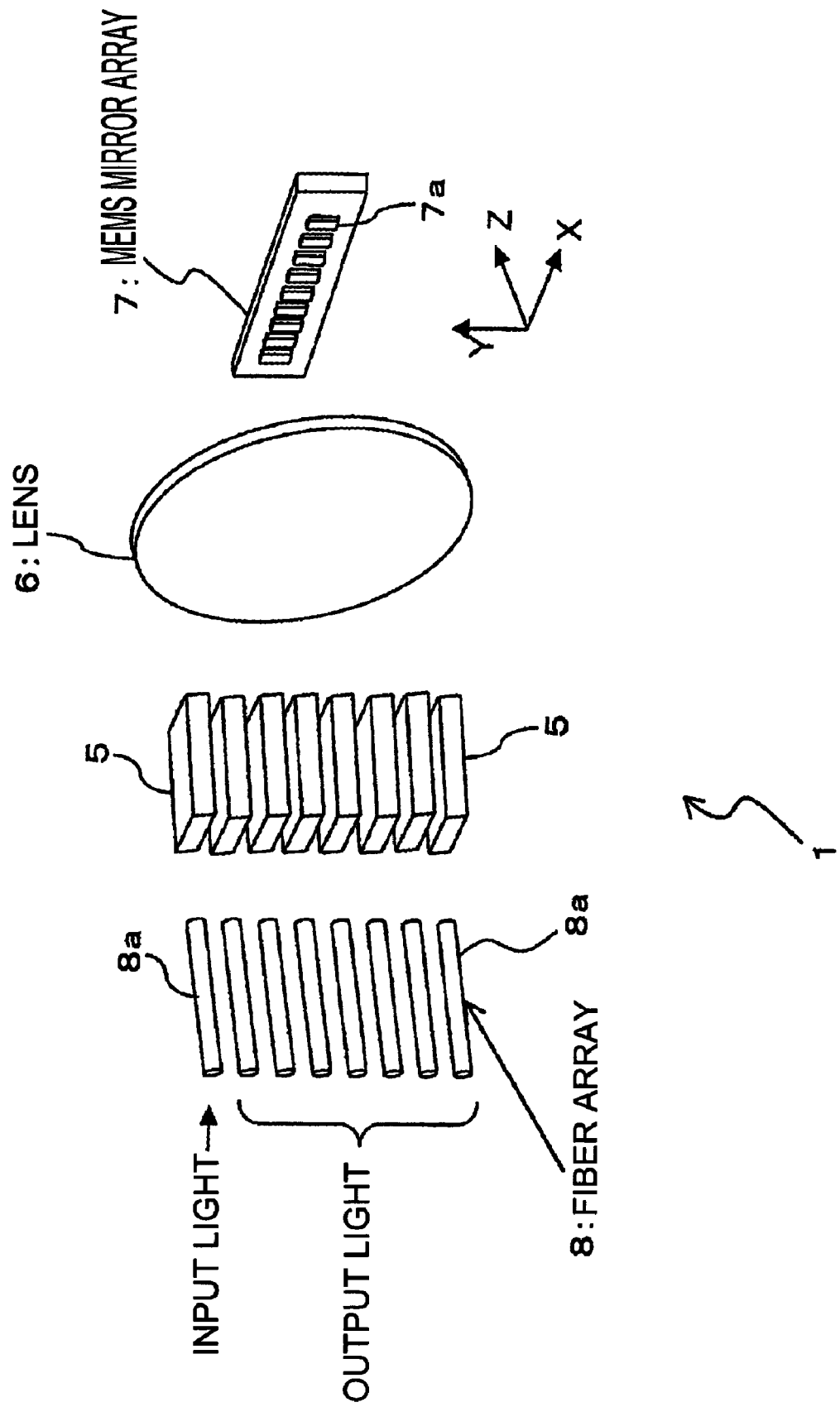
FIG. 1 is a schematic perspective view showing a wavelength selective switch (optical switch) according to a first embodiment of the present invention.
Figure 6:
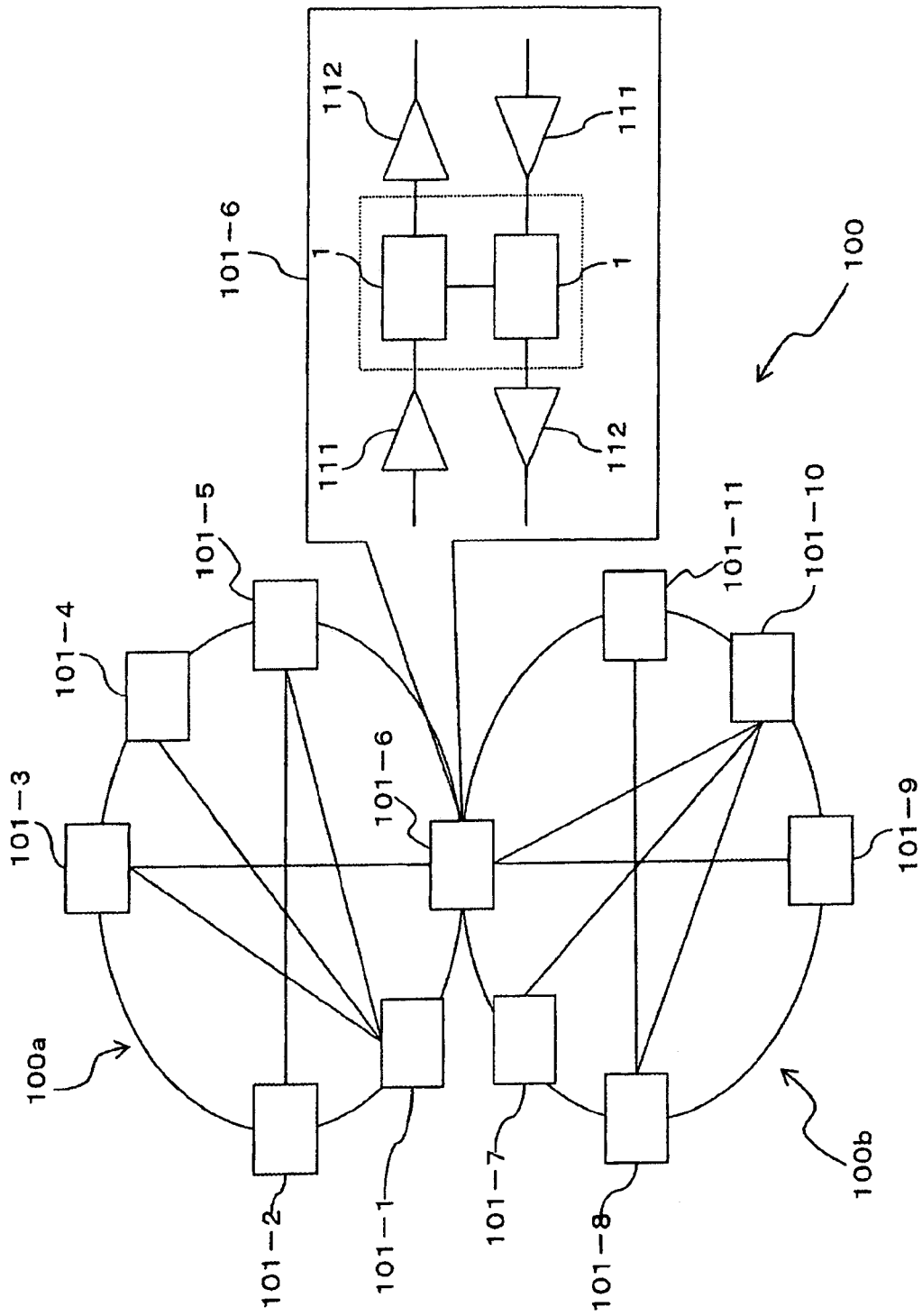
FIG. 6 is a diagram showing an optical network to which the wavelength selective switches according to the first embodiment are applied.

FIG. 1 is a schematic perspective view showing a wavelength selective switch (optical switch) according to a first embodiment of the present invention. The wavelength selective switch 1 according to the first embodiment can be applied to nodes 101 (101-1 to 101-11) constituting an optical network 100 as shown in FIG. 6 for example. In the optical network 100 shown in FIG. 6, the nodes 101-1 to 101-6, and 101-6 to 101-11, respectively, constitute ring networks 100a and 100b. Also, the nodes 101-1 to 101-5, and 101-7 to 101-11 constitute OADM nodes; and 101-6 constitutes a HUB node connecting the ring network 100a and the ring network 100b.

For example, the node 101-6 constituting the HUB node has optical amplifiers 111 and 112, respectively, on connection routes on the input side and the output side, and also has wavelength selective switch 1 with the above-described construction shown in FIG. 1, the wavelength selective switch 1 allowing the connection routes for wavelength multiplexed optical signals to be mutually switched in wavelength units.

The wavelength selective switch 1 has a plurality of optical ports into/from which light is inputted/outputted, and switches light outputted through the optical ports in wavelength units. For example, as shown in FIG. 1, a plurality of optical fibers 8a constituting a fiber array 8 are introduced as the above-described optical ports, and the route is switched so that light inputted from a single optical fiber 8a is outputted to any of the other optical fibers 8a in wavelength units.

In the wavelength selective switch 1 shown in FIG. 1, optical waveguide devices 5 of which the number corresponds to that of the optical fibers 8a constituting the fiber array 8 are arranged in parallel, and also a condensing lens (first lens) 6 and a MEMS mirror array 7 are provided. In FIG. 1, the optical fibers 8a are vertically arranged in parallel to one another, and the optical waveguide devices 5 each optically connected to the optical fiber 8a are also vertically arranged in parallel to one another (i.e., in a laminated manner), in correspondence with the optical fibers 8a.

Figure 2:
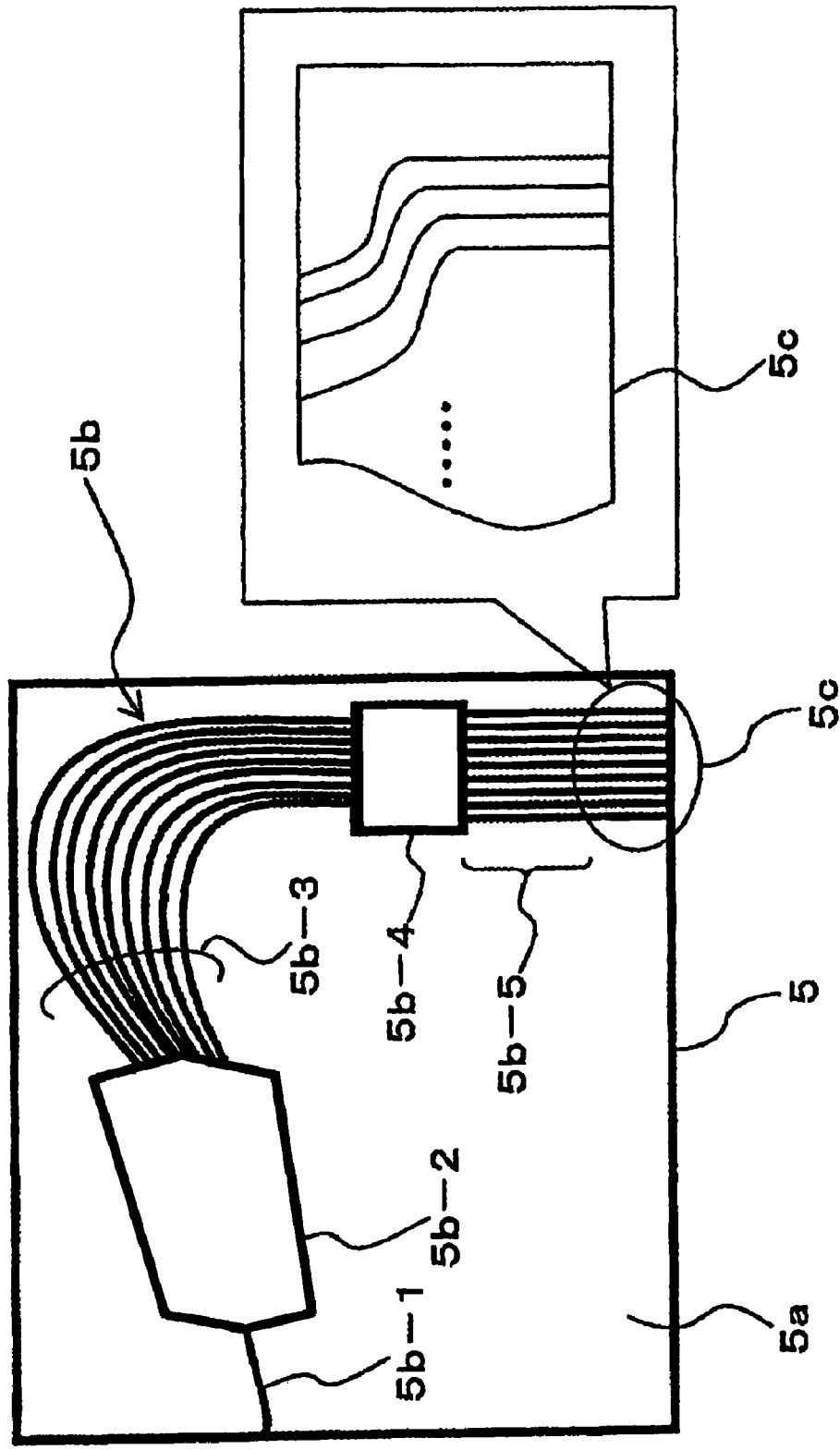
FIG. 2 is a diagram of the construction showing the main section of the wavelength selective switch according to the first embodiment.

Here, the optical waveguide device 5 has a function as the spectroscopic element that spectrally separates (demultiplexes) light beams inputted from a corresponding port, to thereby output them as light beams having optical axes different for each wavelength, and a function as a mirror interface as described later. As shown in FIG. 2, the optical waveguide device 5 has a substrate 5a, and has an AWG waveguide 5b and correction waveguides 5c formed on the substrate 5a.

The AWG waveguide 5b is constructed by sequentially connecting an input waveguide 5b-1, a first slab waveguide 5b-2, arrayed waveguides 5b-3, a second slab waveguide 5b-4, and output waveguides 5b-5. Here, the input waveguide 5b-1 is optically connected to an optical port. The output waveguides 5b-5 are provided in a plurality as optical propagation paths in wavelength units, and optically connected to the MEMS mirror array 7 via a condensing lens 6. That is, light inputted into the input waveguide 5b-1 is spectrally separated by this AWG waveguide 5b, and the spectrally separated light beams for each wavelength are propagated through the output waveguides 5b-5 different from each other.

In the first embodiment, because waveguide type spectroscopic elements are provided as the optical waveguide devices 5, size reduction can be achieved as compared with the conventional diffraction gratings. Especially regarding the thickness, because a thickness of 1 mm or less for example can be achieved, the present optical waveguide device 5 is suitable for thickness reduction. Furthermore, because the present optical waveguide device 5 can increase the diffraction order to increase dispersion, the focal length of the condenser lens can be reduced. Also with this point of view, the size reduction of an optical system can be achieved.

The correction waveguides 5c are a plurality of optical waveguides integrally formed on the substrate 5a constituting the above-described optical waveguide device 5, and connected to the respective output waveguides 5b-5. Light beams for each wavelength, propagating through the output waveguides 5b-5 are emitted from the emission end of the substrate 5a through the correction waveguides 5c.

The MEMS mirror array 7 has a plurality of mirrors optically connected to wavelength-adaptive light emitted from the emission end of the substrate 5a. The mirrors 7a are equidistantly arranged in a horizontal direction in the figure in correspondence with the spectroscopic direction of the optical waveguide devices serving as spectroscopic elements, and are configured as movable mirrors of which the reflection angles are each variably set in an individual manner. The MEMS mirror array 7, therefore, is a mirror device that has a plurality of movable mirrors 7a equidistantly arranged, wherein the movable mirrors 7a cause respective light beams for each wavelength, outputted from the optical waveguide devices 5 serving as the spectroscopic elements to reflect, and allow optical ports of output destinations to be switched by making variable the angles of reflecting surfaces.

As a result, for example, light from the optical fiber 8a at the uppermost position in the figure, constituting the input optical port is spectrally separated by the corresponding optical waveguide device 5 at the uppermost position, and reflected on the mirror 7a corresponding in a wavelength unit. By individually setting the reflection angle of the mirrors, optical paths can be set in wavelength units so that inputted light is introduced into the optical fiber 8a constituting any output optical port.

The light reflected on the mirror 7a is connected to the output waveguides 5b-5 of the optical waveguide device 5 corresponding to the optical fiber 8a of the output destination, and is subjected to wavelength multiplexing in contrast to input light, and introduced from the input waveguide 5b-1 into the optical fiber 8a constituting an output optical port. Here, the optical waveguide device 5 corresponding to the optical fibers 8a constituting the fiber array 8 can be configured to have a minimum loss, for example, by butt-joint connections.

The correction waveguides 5c are connected to the respective plurality of output waveguides 5b-5 constituting the AWG waveguide 5b, and configured to perform interval corrections such as to cause the intervals between the plurality of output waveguides 5b-5 to correspond to the installation intervals of the movable mirrors 7a. In other words, the above-described substrate 5a and correction waveguides 5c formed on the substrate 5a constitute mirror interfaces that have light beams spectrally separated by the AWG waveguide 5b and having optical axes different for each wavelength inputted, that perform optical axis corrections such that the inputted light beams have optical axes corresponding to installation positions of respective movable mirrors 7a for reflecting respective wavelength light beams, and that guide them to the respective movable mirrors 7a.

The correction waveguides 5c of the optical waveguide devices 5 provided in correspondence with the optical fibers 8a serving as output optical ports (from the optical fiber 8a at the second uppermost position down to the optical fiber 8a at the lowermost position) are also arranged at intervals corresponding to the installation intervals of the mirrors 7a. As a result, light beams in wavelength units, reflected on the mirrors 7a are connected to corresponding correction waveguides 5c via the condensing lens 6, and multiplexed (wavelength multiplexed) through the AWG waveguides 5b to thereby be outputted to respective optical fibers 8a through the input waveguide 5b-1.

Here, focusing attention on the construction of the above-described correction waveguides 5c in the optical waveguide device 5 and the construction of the MEMS mirror array 7, a mirror unit can be constructed by the general-purpose MEMS mirror array 7, which is a mirror device composed of a plurality of movable mirrors 7a arranged at equal intervals, and the optical waveguide device 5B serving as interfaces, wherein the optical waveguide device 5B performs optical axis corrections such that each reflection target light beam to be reflected on a respective one of the plurality of movable mirrors 7a has an optical axis corresponding to the installation position of the respective one of the movable mirror 7a, and thereupon introduces each of the reflection target light beams into the respective one of the movable mirror 7a. In the first embodiment, also regarding the AWG waveguides 5b serving as spectroscopic elements, the mirror unit is constituted by integrating the optical waveguide device 5 and the MEMS mirror array 7 into a single unit.

In the optical network 100 with the above-described construction, at each node 101, light path switching in a wavelength unit is performed through the wavelength selective switch 1.

At this time, in the wavelength selective switch 1, light beams inputted from the optical fiber 8a constituting the input optical port are spectrally separated in the optical waveguide devices 5 and reach the MEMS mirror array 7. Here, light beams in wavelength units connected to the output waveguides 5b-5 are subjected to optical axis corrections by the correction waveguides 5c so as to have optical axes corresponding to the installation intervals of the movable mirrors 7a. The light beams with respective wavelengths, that have been subjected to optical axis corrections are made incident on the respective mirrors 7a via condensing lens 6.

Here, the angle of each of the mirrors 7a are individually adjusted by a mirror angle adjusting mechanism (not shown) provided in the MEMS mirror array 7, and it is selectively switched to which one out of the arrayed waveguide devices 5 from the second uppermost located one down to the lowermost located one, that is, the optical fiber 8a to be guided as an output destination is selectively switched. Thus, the output destination path of light beams incident from the optical fiber 8a constituting the input optical port can be arbitrary selected for each wavelength to the optical fiber 8a constituting an arbitrary output optical port.

Figure 3:
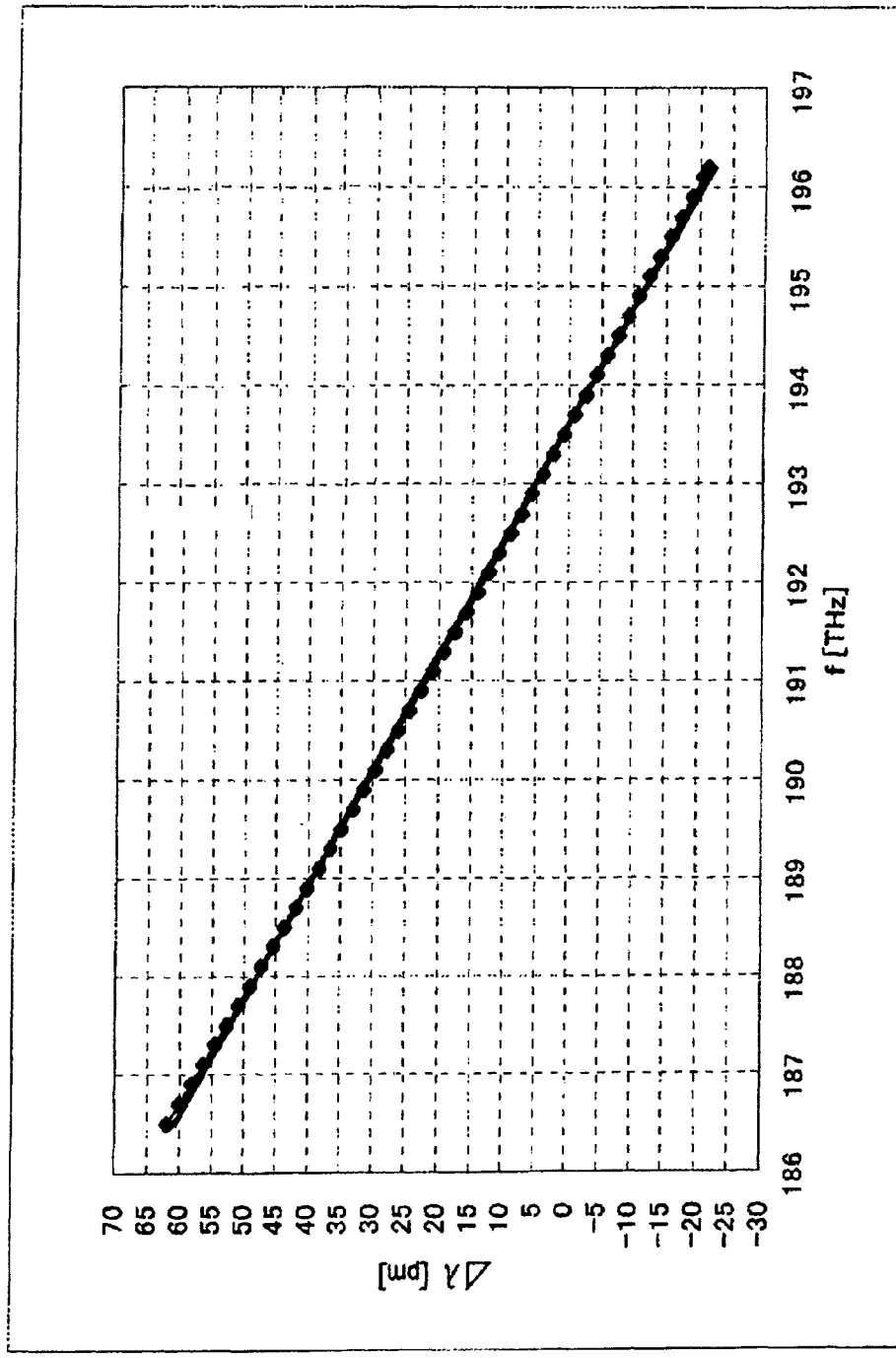
FIG. 3 is a diagram for explaining problems to be solved in the first embodiment.

As described above, the channel arrangement applied for wavelength multiplexing optical signals prescribed by the ITU has an equidistant arrangement on the optical frequency axis. Replacing this channel arrangement with that on the optical wavelength axis, the channel arrangement becomes non-equidistant, as shown in FIG. 3. FIG. 3 shows the deviation $\Delta\lambda$ from 800 picometer (wavelength interval) versus the frequency f with an interval of 100 GHz in a C+L band. As shown in FIG. 3, it can be seen that, as the optical frequency shifts toward the low frequency side (i.e., long wavelength side), the wavelength deviation $\Delta\lambda$ becomes larger. In other words, the channel arrangement applied for wavelength multiplexing optical signal is non-equidistant on the wavelength axis.

An isophase surface of light beams is formed in wavelength units by the interference of light beams in the second slab waveguide 5b-4 constituting the AWG waveguide 5b, and therefore, in each of the output waveguides 5b-5, light beams are connected in wavelength units. In spectrally separating light beams at low loss in the channel arrangement prescribed by the ITU, the intervals of the output waveguides 5b-5 guided from the second slab waveguides 5b-4 becomes unequal, as well. In other words, AWG device 5 has the output waveguides 5b-5 for disperse in accordance with optical channel on same frequency interval on the frequency axis.

In general, as the arrayed waveguide grating device, a construction that guides the output waveguides to the optical fibers by butt-joints is in common use, and hence, it has sufficed to prescribe an output waveguide interval within the limits of the construction.

Figure 4:
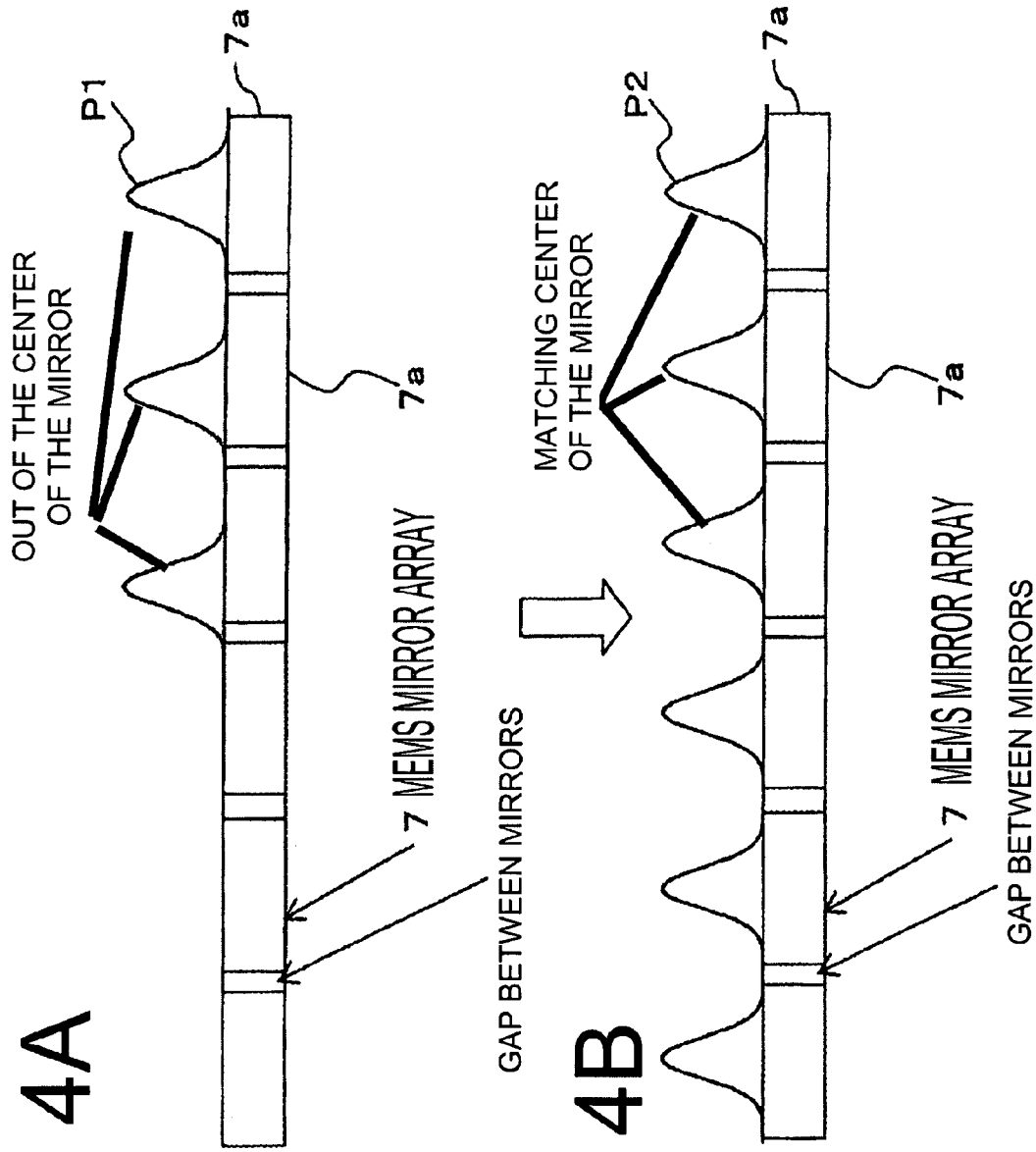
FIGS. 4A and 4B are diagrams each explaining effects in the first embodiment.

As a result, for example, when attempting to make light beams outputted from the above-described non-equidistant output waveguides 5b-5 incident on the mirrors 7a constituting the MEMS mirror array 7 as they are, or when attempting to make light beams for each channel, spectrally separated by the conventional diffraction gratings incident on the mirrors 7a, the installation intervals of the mirrors 7a and the peaks (P1) of optical intensities of signal light beams for each channel does not mutually conform, as shown in FIG. 4A.

Figure 5:
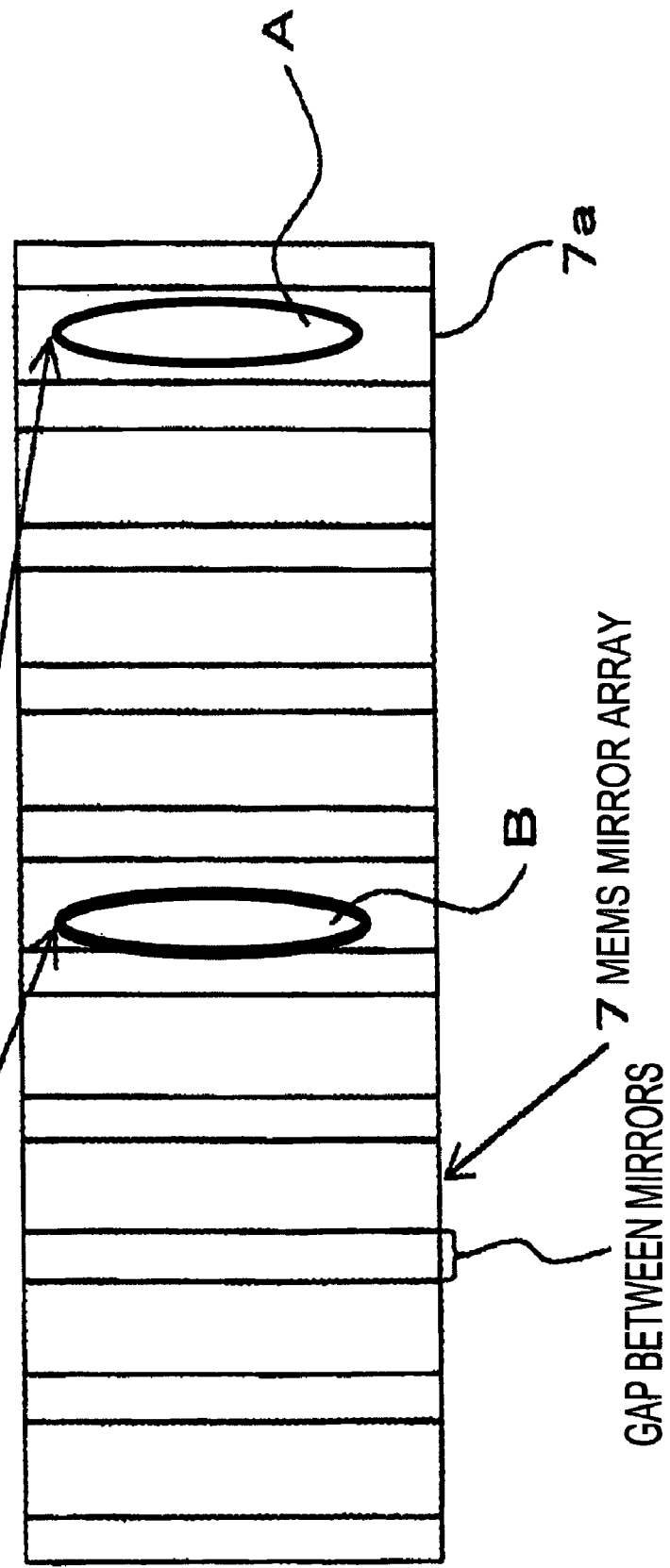
FIG. 5 is diagram for explaining effects in the first embodiment.

Alternatively, as shown in FIG. 5, some spots (S) of signal light beams for each channel, condensed by the lens 6 does not conform to the centers of the mirrors 7a. For example, as indicated by A in FIG. 5, although the spot of wavelength light incident on the mirror 7a located at the right end of the MEMS mirror array 7 is positioned at a mirror center, the spot of wavelength light incident on the mirror 7a located at central part of the MEMS mirror array 7 deviates from a mirror center.

In this case, since signal light beams for each channel deviate from mirror centers, the connection efficiency with respect to the output light port at a route switching destination decreases, leading to deterioration of pass bands or an occurrence of variations in pass bands for each wavelength.

In contrast, as in the first embodiment, when the optical waveguide devices 5 are applied for spectroscopic elements of the wavelength selective switch 1, by further forming the correction waveguides 5c serving as the mirror interfaces, signal light beams can be outputted as light beams with optical axes corresponding to installation intervals in the movable mirrors 7a, as shown in FIG. 4B, so that it is possible to conform the peak (P2) of optical intensity to the central position of each of the movable mirrors 7a to thereby reduce a reflection loss and prevent the deterioration of pass bands, thereby allowing prevention of the occurrence of variations in pass bands for each channel.

In this manner, according to the first embodiment of the present invention, since the simple construction with the substrate 5a and the correction waveguides 5c serving as mirror interfaces allows focus images on the movable mirrors 7a to be optimized, advantages in preventing the deterioration of pass bands, and in turn preventing the occurrence of variations in pass bands for each channel are brought about.

Furthermore, there is no need to additionally use specific optical components such as a wedge-shaped prism, and there is no necessity for increasing the number of optical components composing the optical system, unlike the conventional technique. It is therefore possible to reduce loss compared with the conventional technique, even with the simple construction that does not increase workload for the adjustment of an optical alignment or the difficulty level of assembly.

Furthermore, only by improving the construction of the optical waveguide devices 5 serving as spectroscopic elements, the need to design the MEMS mirrors to be unequally spaced so as to become optimal with respect to each wavelength is eliminated, which allows the application of the general-purpose MEMS mirror array.

[A1] Description of Modification of First Embodiment

Figure 7:
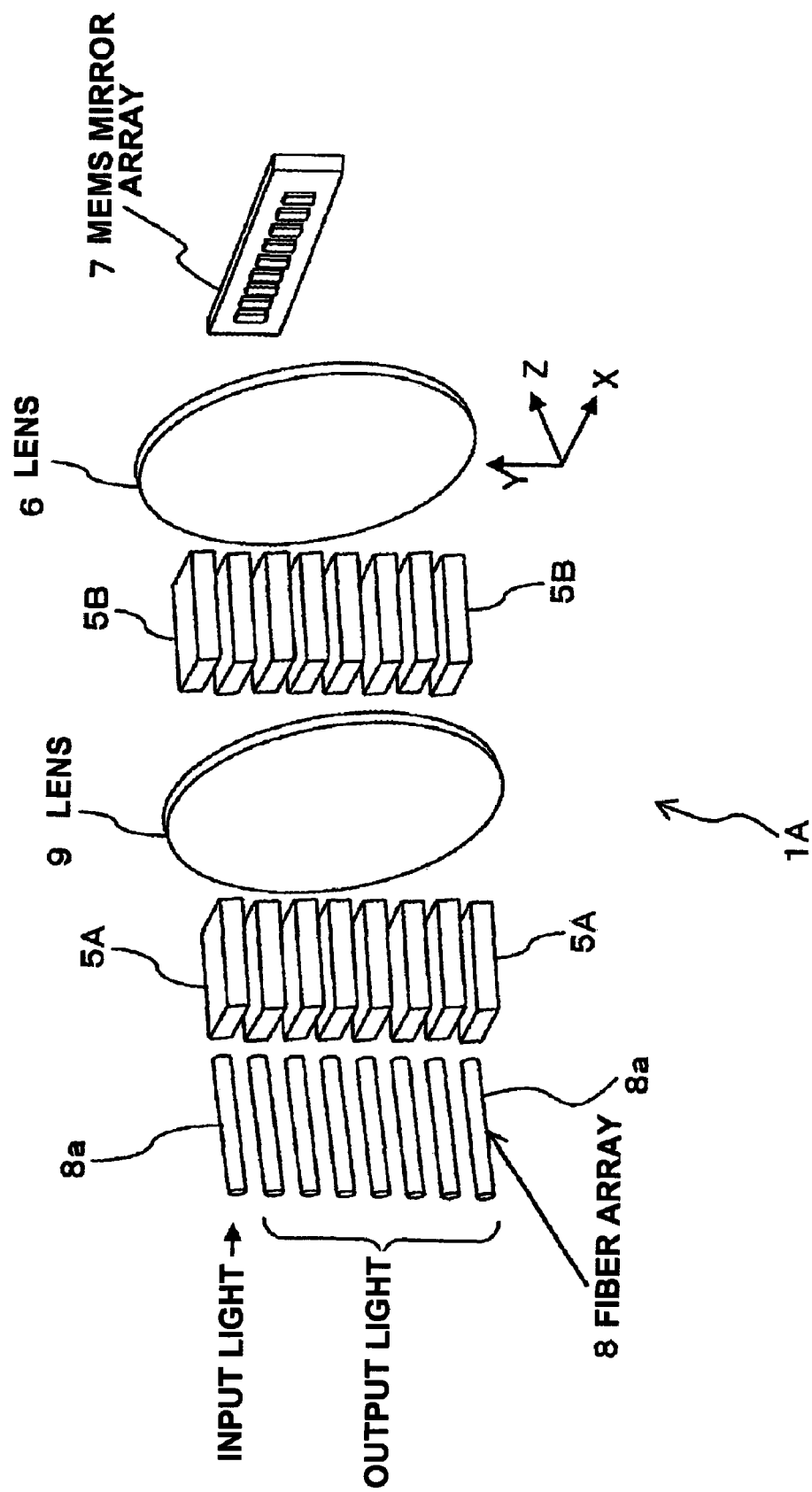
FIG. 7 is a schematic perspective view showing an optical switch according to a modification of the first embodiment of the present invention.
Figure 8:
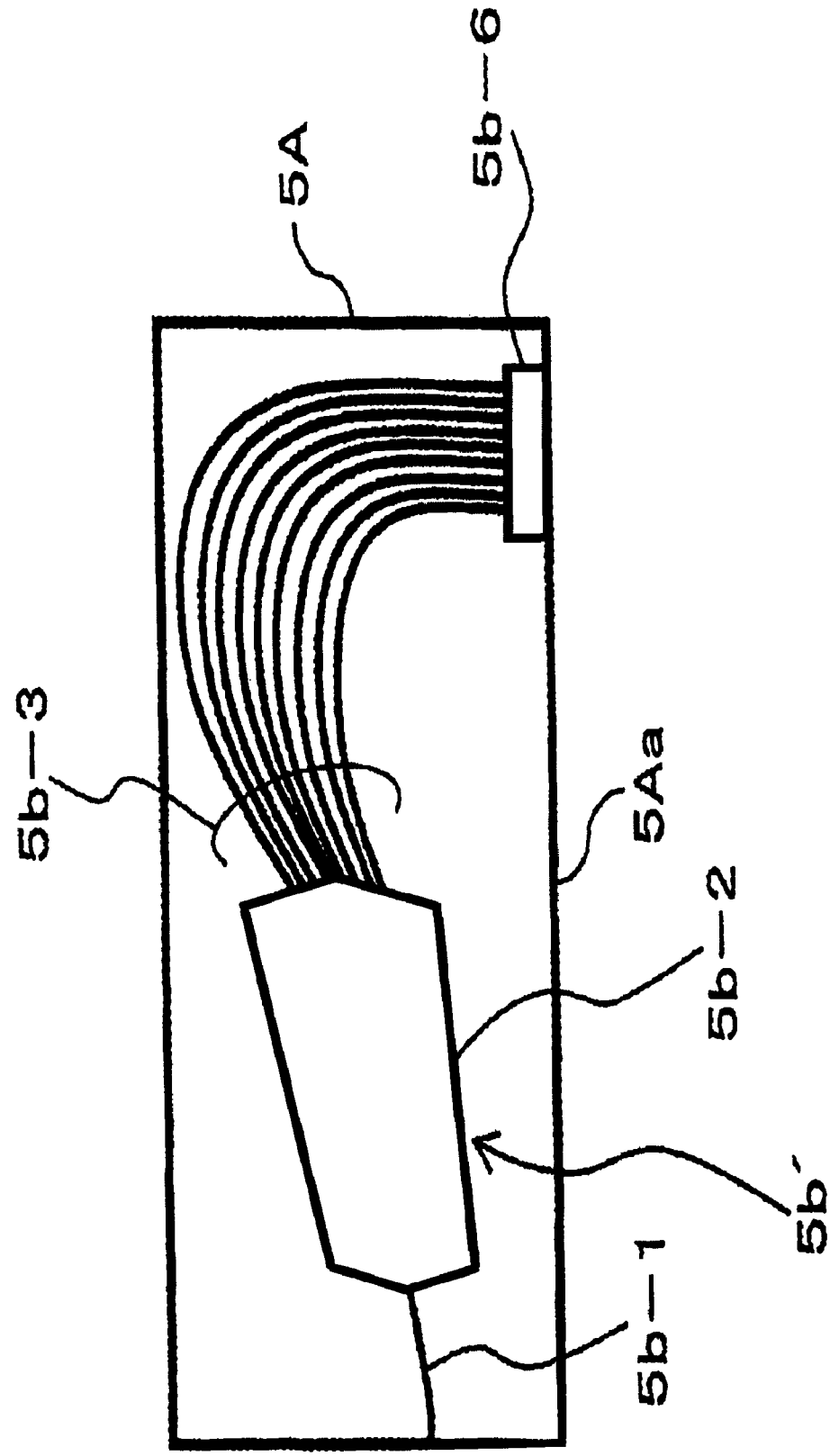
FIG. 8 is a diagram showing the construction of the main section of the optical switch shown in FIG. 7.
Figure 9:
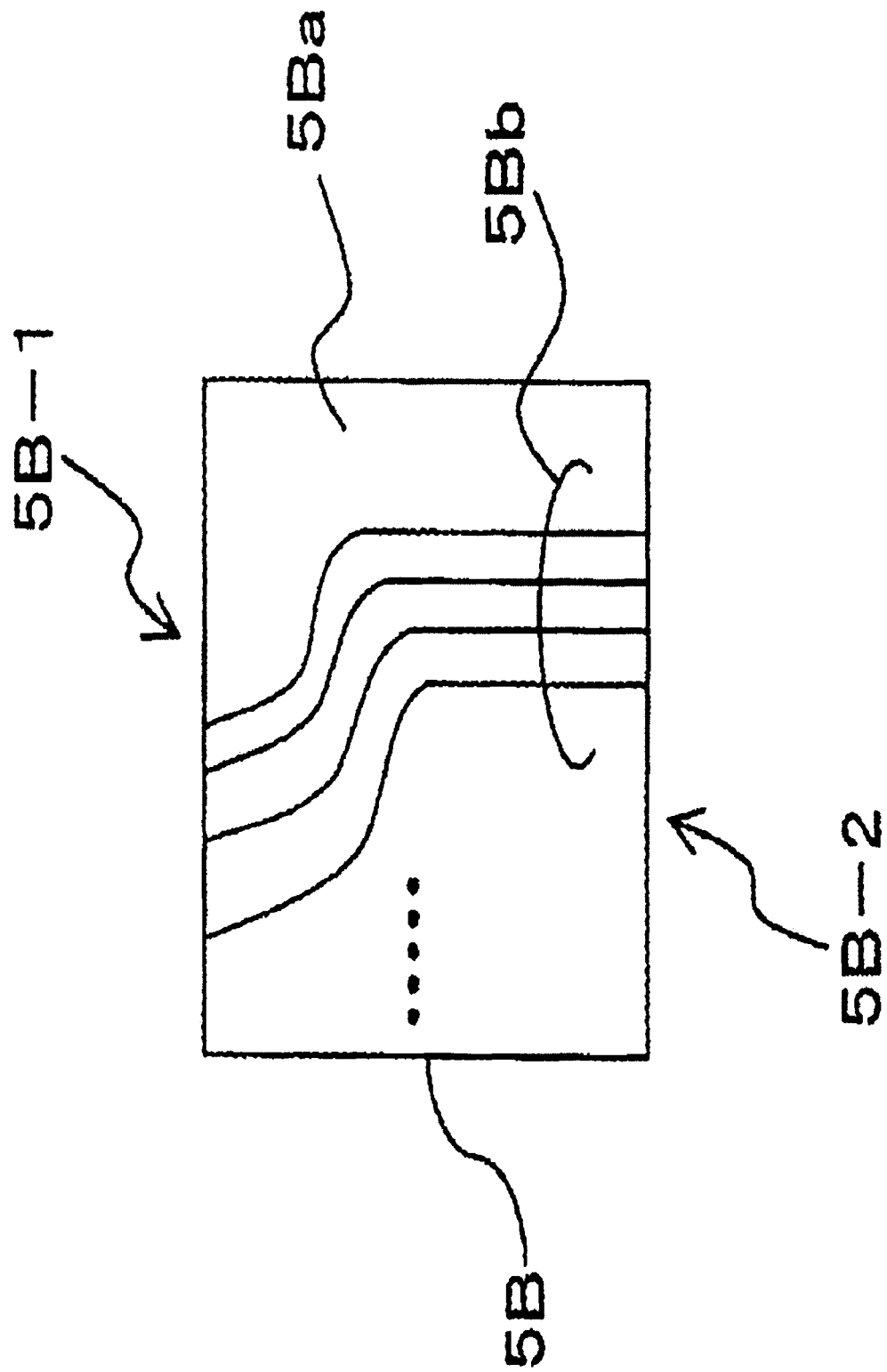
FIG. 9 is a diagram showing the construction of the main section of the optical switch shown in FIG. 7.

FIG. 7 is a schematic perspective view showing an optical switch 1A according to a modification of the first embodiment of the present invention. The wavelength selective switch 1A shown in FIG. 7 has a construction in which the above-described optical waveguide devices 5 in the first embodiment is divided into the arrayed optical waveguide devices 5A (refer to FIG. 8) serving as spectroscopic elements, and the optical waveguide devices 5B (refer to FIG. 9) serving as mirror interfaces, and in which a lens (second lens) 9 is interposed between the arrayed optical waveguide devices 5A and the optical waveguide devices 5B. In FIGS. 7 to 9, the same symbols as those in FIGS. 1 and 2 designate substantially the same parts.

Here, the arrayed waveguide grating devices 5A, which functions as spectroscopic elements, can be each constructed by including a substrate 5Aa, and an AWG waveguide 5b' formed on the substrate 5Aa. The AWG waveguide 5b', which is different from the one shown in FIG. 2, may have a construction in which, as shown in FIG. 8, the second slab waveguide 5b-4 and the output waveguides 5b-5 shown in FIG. 2 are omitted, and in which a region 5b-6 is formed integrally with the emission end side of the arrayed waveguide 5b-3.

In this case, light beams emitted from the arrayed waveguide grating device 5A are dispersed for each wavelength as in the case of light beams emitted from the conventional diffracting gratings, and light beam emitted to the optical waveguide device 5B via the lens 9 have optical axes arranged in a horizontal direction in the figure, for each wavelength.

The optical waveguide device 5B, which functions as a mirror interface, includes a substrate 5Ba, and a plurality of correction waveguides 5Bb formed on the substrate 5Ba, as shown in FIG. 9. The correction waveguides 5Bb have light beams to be reflected on the mirrors 7a inputted from one end face of the substrate 5Ba as reflection target light beams, and performs optical axis corrections such that the inputted reflection target light beams have optical axes corresponding to the installation positions of the mirrors 7a.

That is, the correction waveguides 5Bb are formed so as to be unequally spaced on one end face 5B-1 side (the arrayed waveguide grating device 5A side) of the substrate 5Ba, while, on the other end face 5B-2 side (the MEMS mirror array 7 side) of the substrate 5Ba, the correction waveguides 5Bb are formed so as to be equally spaced in correspondence with the installation positions of the mirrors 7a. In other words, the formation pattern itself of the correction waveguides 5Bb can be made substantially equal to the above-described correction waveguides 5c shown in FIG. 2.

As a result, light beams spectrally separated by the arrayed waveguide grating device 5A are connected to the correction waveguides 5Bb formed at corresponding positions for each wavelength, and are subjected to optical axis corrections by propagating through the correction waveguides 5Bb. Then, the light beams that have subjected to such optical axis corrections are emitted from the other end face of the substrate 5Ba, and made incident on the mirrors 7a via the lens 6. In correspondence with the optical fibers 8a constituting output optical ports, there are provided the arrayed waveguide grating devices 5A and the optical waveguide devices 5B. In the optical waveguide devices 5B, therefore, light beams reflected on the mirrors 7a can also be subjected to optical axis corrections such as to be wavelength multiplexed by the arrayed waveguide grating devices 5A.

Thus, a simple construction in which the optical waveguide devices 5B serving as mirror interfaces is added, allows prevention of the deterioration of pass bands, and in turn enables prevention of the occurrence of variations in pass bands for each channel. Also, this construction eliminates the need for designing the mirrors 7a to be unequally spaced so as to be optimal with respect to each wavelength, and allows the general-purpose MEMS mirror array 7 to be applied. Moreover, it is expected to relatively easily perform a correct optical axis setting in wavelength units, compared with the case where a prism is interposed.

In the above-described case, for AWG waveguide 5b' constituting the arrayed waveguide grating device 5A, one shown in FIG. 8 is applied. However, according to the present invention, the AWG waveguide 5b' may have the construction of the AWG waveguide 5b as shown in FIG. 2 illustrated above.

In the above-described first embodiment, out of the plurality of optical fibers 8a vertically arranged in parallel, constituting the fiber array 8, the optical fiber 8a at the uppermost position is made an input optical port, and the optical fibers 8a from the second uppermost position down to the lowermost position are made output optical fibers 8a. However, according to the present invention, the optical fibers 8a at intermediate positions may be made input ports, and the optical fibers 8a at the other positions may be made output optical fibers 8a. By doing this, the variable angles of the mirrors 7a can be made even with respect to optical input/output ports, so that insertion loss characteristics between these ports can be made even (optimal). In this case, the arrayed waveguide grating device 5A may be constructed by the conventional diffraction gratings.

[B] Description of Second Embodiment

Figure 10:
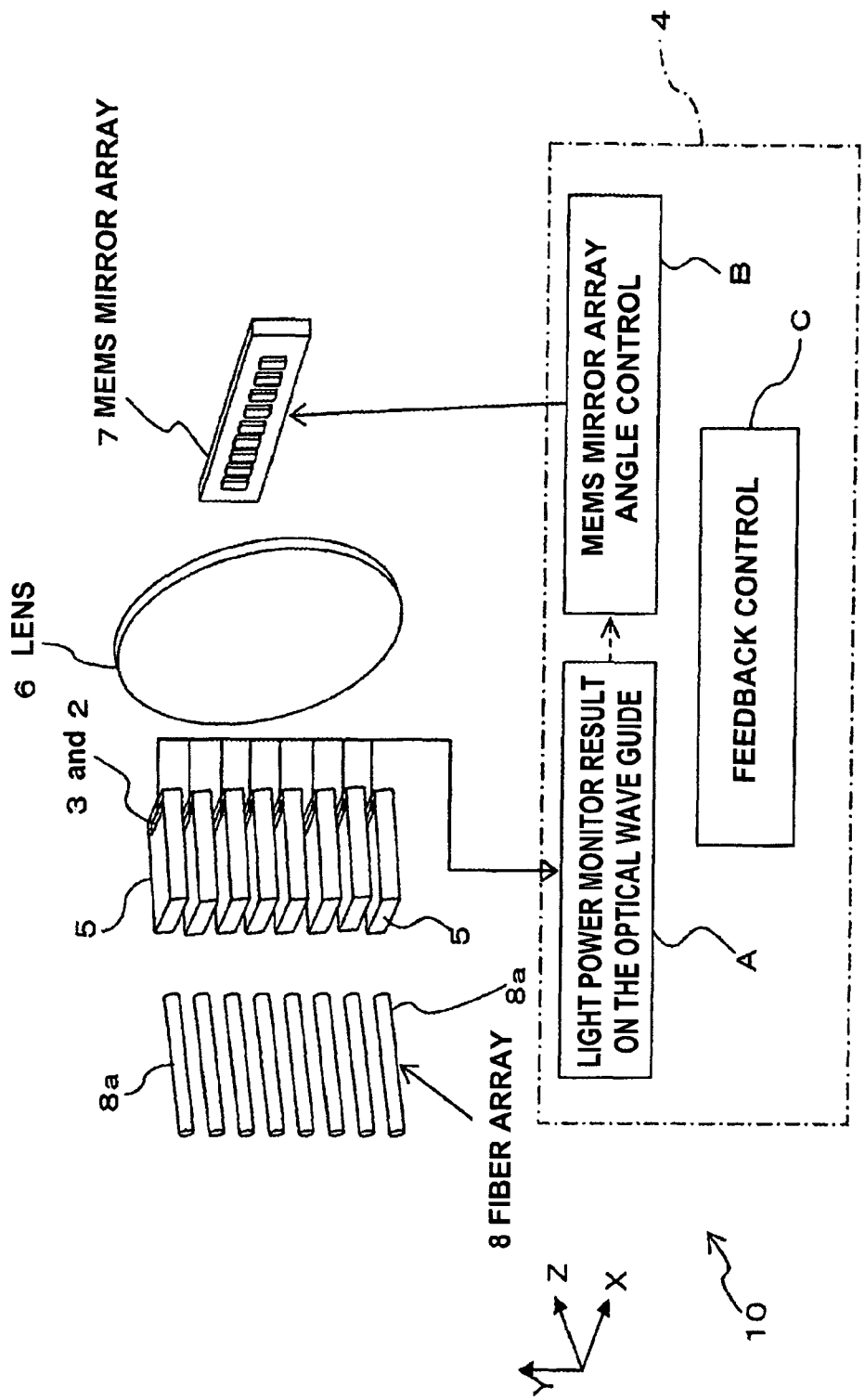
FIG. 10 is a schematic perspective view showing a wavelength selective switch (optical switch) according to a second embodiment of the present invention.
Figure 11:
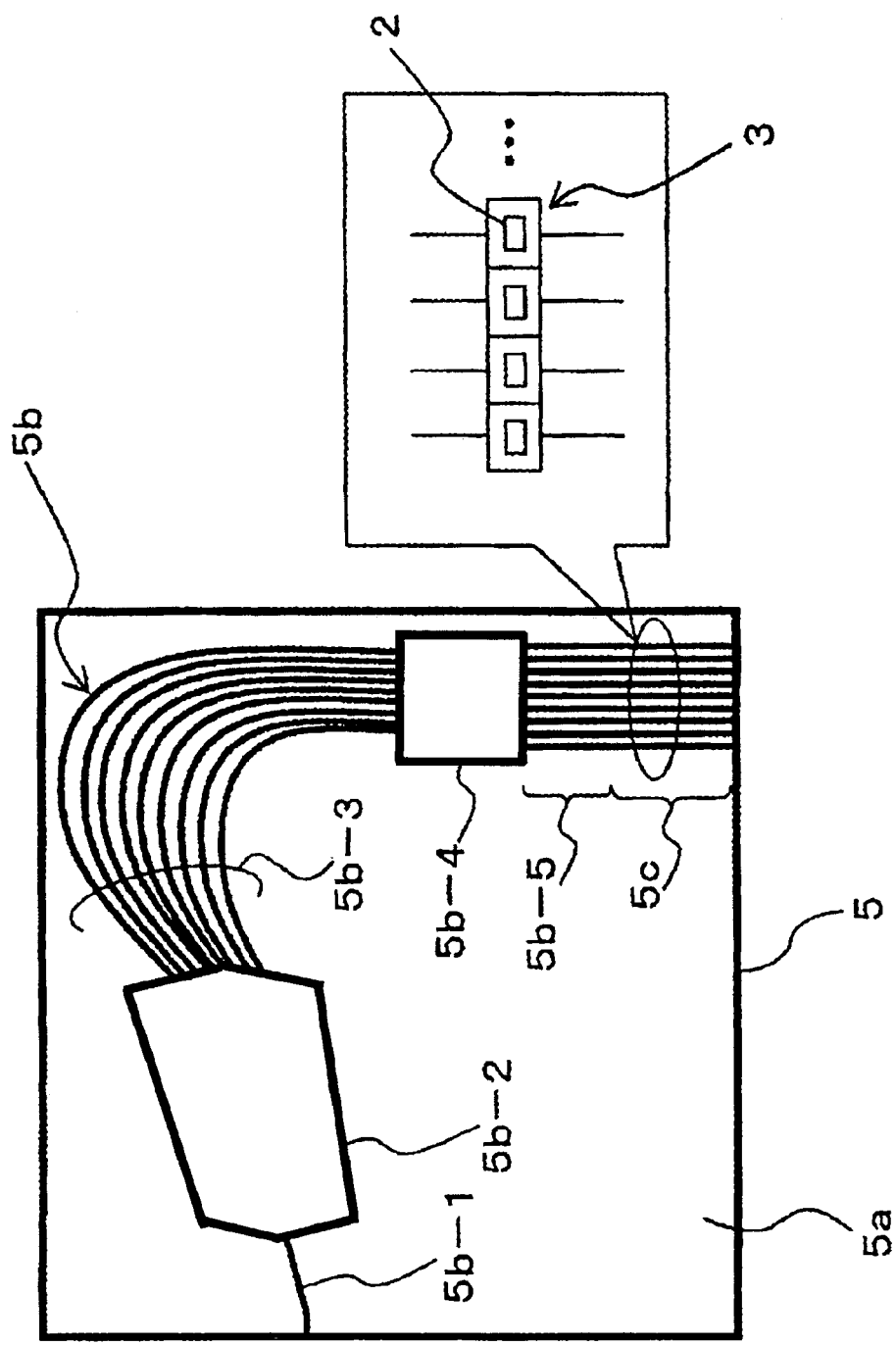
FIG. 11 is a diagram showing the construction of the main section of the wavelength selective switch according to the second embodiment.

FIG. 10 is a schematic perspective view showing a wavelength selective switch (optical switch) according to a second embodiment of the present invention. The wavelength selective switch 10 according to the second embodiment has a construction different from the above-described wavelength selective switch 1 according to the first embodiment. That is, as shown in FIGS. 10 and 11, in the formation place of a plurality of correction waveguides 5c constituting the optical waveguide devices 5, corresponding to the input and output optical ports, there are provided a PD allay 3 (photodiodes 2) serving as light-receiving elements for monitoring propagating light beams; and a control unit 4 for controlling the reflection angles of the mirrors 7a based on monitoring results of the propagating light beams in the photodiodes 2, as shown in FIG. 10.

In the second embodiment, out of a plurality of vertically arranged optical fibers 8a constituting the fiber array 8, the optical fibers 8a at intermediate positions are made input optical ports, and the other optical fibers 8a are made output optical ports. This makes even the variable angle of the mirrors 7a with respect to optical input/output ports, and makes even (optimal) the insertion losses between these ports.

The other constructions are basically the same as those of the first embodiment. In FIGS. 10 and 11, the same symbols as those in FIGS. 1 and 2 designate substantially the same parts.

Figure 12:
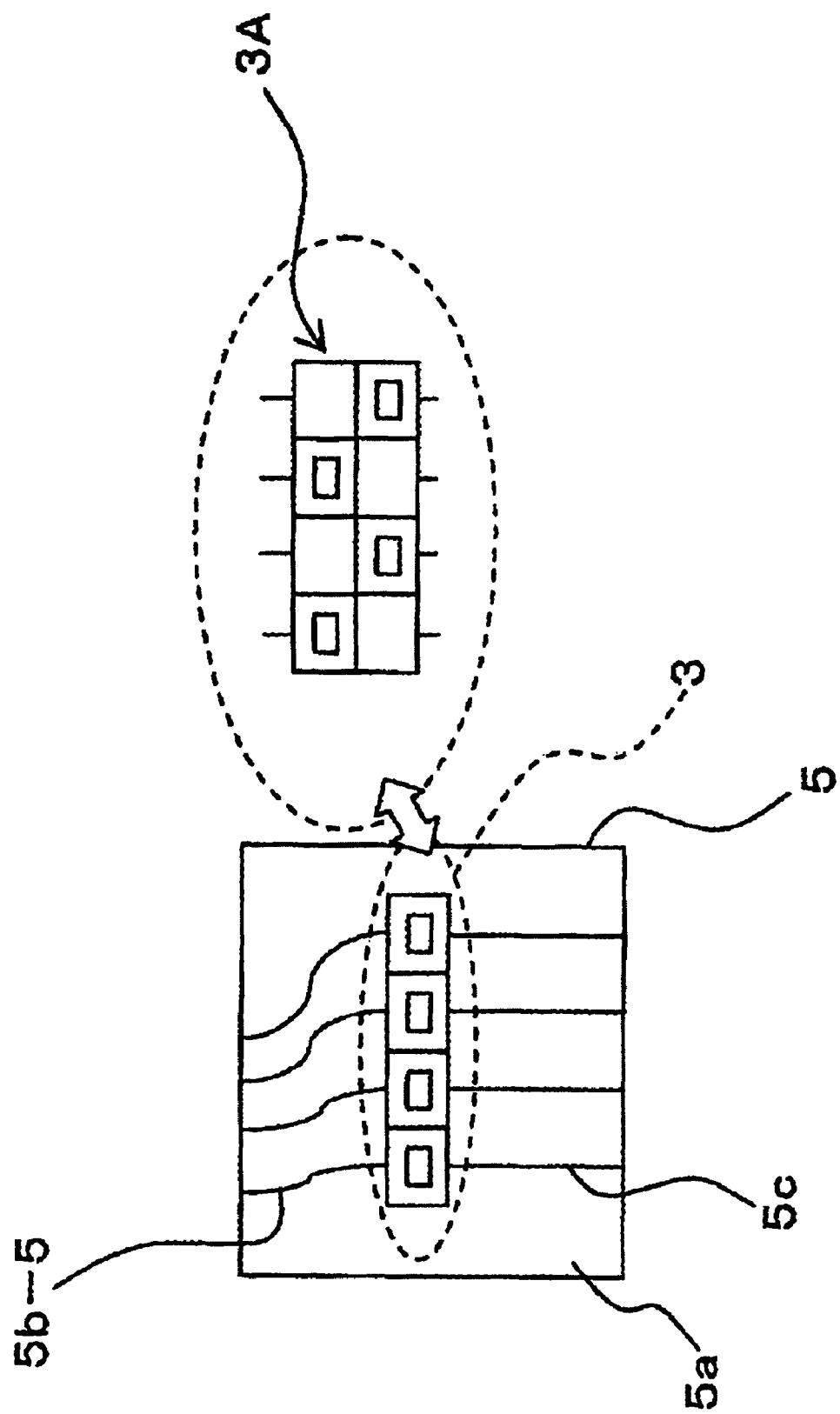
FIG. 12 is a diagram of the construction showing the main section of the wavelength selective switch according to the second embodiment.

Here, photodiodes (PD) 2 are light-receiving elements for monitoring light beams propagating through a corresponding correction waveguide 5c, the light-receiving elements being provided in their respective formation places of the correction waveguides 5c. The photodiodes 2 can be constructed as the PD allay 3 arranged in an allay manner in the formation places in the correction waveguides 5c. Alternatively, when it is difficult to array in line the photodiodes 2 on a plurality of correction waveguides 5c because of the narrowness of interval between adjacent correction waveguides 5c, the photodiodes 2 can be also constructed as a PD allay 3A in which the photodiodes 2 are arrayed in a hound's-tooth check pattern as shown in FIG. 12, thereby allowing an improvement in mounting efficiency.

Figure 13:
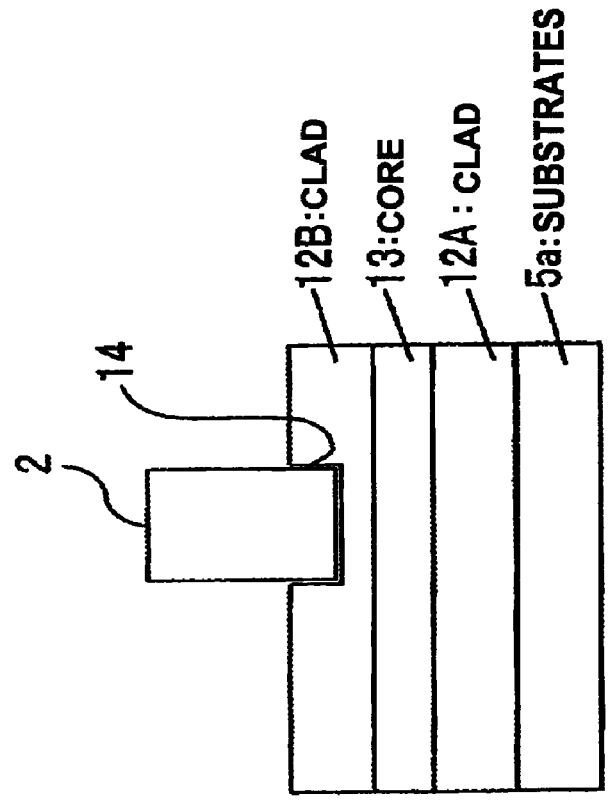
FIGS. 13A and 13B are diagrams each explaining the construction of the main section of the main section of the wavelength selective switch according to the second embodiment.
Figure 13:
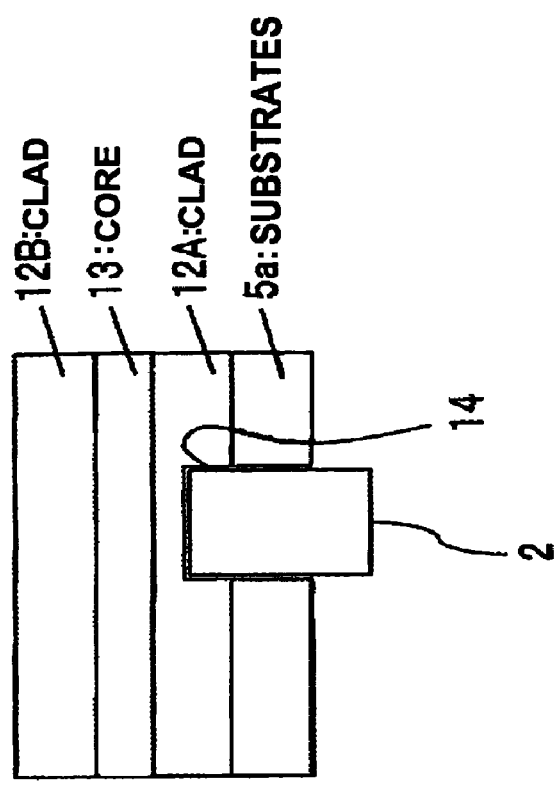

FIGS. 13A and 13B are sectional views each showing an example of the installation of the photodiode 2 into the formation place of the correction waveguides 5c, each being a sectional view taken away along the direction in which the correction waveguide 5c are formed. The correction waveguide 5c makes up an optical waveguide together with the AWG waveguide 5b, and the optical waveguide has a construction in which, on the substrate 5a, a lower clad layer 12A, a core layer 13, and an upper clad layer 12B are laminated in this order.

That is, the region of the core layer 13 surrounded by the clad layers 12A and 12B is formed so as to be higher in refraction index than the clad layers 12A and 12B, so that light propagates being enclosed in the core layer 13. In other words, the pattern of optical waveguide is determined by the shape of the core layer 13. Here, the refraction index difference Δ between the core layer 13 and the clad layers 12A and 12B can be made to be on the order of 0.5.

The photodiode 2 has a depression region 14 so that the clad layers 12A and 12B in the vicinity of the core layer 13 constituting the correction waveguide 5c formed as described above, become thinner than the other regions, to thereby mount the photodiode 2 in the depression region 14. FIG. 13A shows the case where the depression region 14 is provided in the upper clad 12B, and FIG. 13B shows the case where some region of the substrate 5a for mounting the photodiode 2 is removed as well as the depression region 14 is provided in a part of the lower clad 12A. In either case, the photodiode 2 is mounted so that its light-receiving surface is directed to the core layer 13 side in the depression region 14. This allows leakage optical components of light propagating through the core layer 13 to be received.

When the correction waveguides 5c is constructed with the refraction index Δ as 0.5, the places of the clad regions 12A and 12B entering the depression region 14 is configured to have a thickness of not more than 1 μm, whereby a sufficient monitoring optical intensity can be achieved.

The control unit 4 is operative to control the reflecting surface angles in the mirrors 7a in response to monitoring results by the photodiode 2.

That is, the photodiode 2 mounted as described above receives a part of leakage optical component of light propagating through the core layer 13 constituting the corresponding correction waveguide 5c. The light beams propagating through the correction waveguides 5c are light beams in wavelength units, inputting/outputting into/from optical ports. The control unit 4 receives monitoring results from the photodiode 2 in the optical waveguide device 5 corresponding to each optical port, whereby it can acquire monitoring control information for switching in the wavelength selective switch 10.

Specifically, by acquiring the monitoring information from the photodiode 2 (refer to FIG. 10A), the control unit 4 can obtain optical power information for each channel in respective optical waveguide devices 5 as monitoring control information. Furthermore, by integrating detection light power from the photodiode 2 that is acquiring optical power information, a total optical power of the light beams propagating through the correction waveguides 5c can be calculated. Moreover, by calculating the arrangement (address) of the photodiode 2 that is receiving the optical power, wavelength number information and wavelength allocation information can be obtained.

When the wavelength selective switch 10 in the second embodiment is applied to the above-described node 101 of the optical network 100 as shown in FIG. 6, the aforesaid information acquired by the control unit 4 can be exchanged between nodes through an OSC (optical supervisor channel), so that the wavelength information management of the system as a whole can also be achieved.

Based on monitoring results by the photodiodes 2 of the optical waveguide devices 5 corresponding to output optical ports, the control unit 4 performs feedback control of the reflection angles in the mirrors 7a (refer to FIGS. 10B and 10C). Consequently, the control unit 4 controls the optical connection efficiency of reflecting light on the mirrors 7a with respect to the correction waveguides 5c constituting the output optical port-adaptive optical waveguide device 5, with power of light outputted from the optical fiber 8a constituting an output optical port as a target value.

For example, by optimizing the connection efficiency of light with respect to the correction waveguides 5c, or by performing variable attenuation control, it is possible to perform variable attenuation control of optical power connected for each wavelength component to the correction waveguides 5c. Specifically, control for suppressing wavelength-dependant characteristic or tilt adjustment control can be performed.

In the wavelength selective switch 10 according to the second embodiment with the above-described construction, as in the case of the above-described first embodiment, the optical axes have been corrected so that the optical axis arrangement intervals in light beams for each wavelength of light beams outputted from the optical waveguide device 5 to the mirrors 7a constituting the MEMS mirror array 7 correspond to installation intervals of the mirrors 7a. Therefore, as in the case of the first embodiment, it is possible to optimize focus images in the mirrors 7a and prevent the deterioration of pass bands, and in turn, to prevent an occurrence of variation in pass bands for each channel, by the simple construction having the substrate 5a constituting the mirror interfaces, and the correction waveguides 5c.

Furthermore, since the photodiodes 2 are mounted in the formation places of the correction waveguides 5c in the optical waveguide devices 5, an optical monitoring function and an angle controlling function with respect to the mirrors 7a can be combined in a module as the wavelength selective switch 10. Therefore, as compared with the conventional construction equipped with a possible optical spectrum analyzer in the conventional art, the need to perform communications between modules is eliminated, and further, as compared with the redundant arrangement set for in the above-described patent document 1, the number of components can be cut down, leading to significant reduction in apparatus scale.

Taking an example from the above-described construction shown in FIG. 7, even if the construction having the arrayed waveguide grating devices 5A serving as spectroscopic elements and the optical waveguide devices 5B serving as mirror interfaces is used, photodiodes can be mounted at the formation places in the correction waveguides 5Bb, as well.

Also, in the above-described second embodiment, an explanation has been made of the construction such that the photodiode 2 is mounted in the optical waveguide device 5 in which the correction waveguides 5c are formed together with the AWG waveguide 5b. However, according to the present invention, in at least waveguide type spectroscopic elements like the output waveguides 5b-5, photodiodes may be mounted on the optical waveguide that propagates spectrally separated wavelength-adaptive light beams. By doing this, at least a monitoring function and a mirror angle control function can be incorporated in the module serving as the optical switch, as compared with the prior art construction. This eliminates the need for communications between modules, and enables a significant reduction of the scale of apparatuses relating to the wavelength selective switch.

[C] Others

Without being limited to the above-described embodiments, the present invention can be otherwise variously practiced without departing the spirit of the present invention.

For example, in the wavelength selective switches 1 and 10 in the above-described first and second embodiments, the number of the optical fiber 8a constituting an input port is made "1", and the number of the optical fibers 8a constituting output ports is made a "plurality" ("7" in the figure). However, according to the present invention, the other combinations of numbers of input/output ports shall not be precluded. For example, the number of input optical ports can be set to any of 1 to M (M is an arbitrary integer of not less than 2), while the number of output optical ports can be set to N (N is an arbitrary integer of not less than 2). Alternatively, the number of input optical ports can be set to M, while the number of output optical ports can be set to any of 1 to N.

Also, in the optical waveguide device 5 in the above-described second embodiment, if the core region constituting an optical waveguide is configured to be doped with rare-earth element, and the optical waveguide devices 5, 5A, and 5B are configured to be provided with excitation light, the optical waveguide device 5 can have a function as an optical amplifier at the same time. In this case, through the control of reflection angles of the mirrors 7a, the control unit 4 can realize output constant control or gain constant control with respect to light beams propagating through the correction waveguides 5c, based on the values of optical powers monitored by the photodiode 2.

For example, when the output constant control is performed, the angle of the mirror 7a is adjusted so that the optical output value becomes a target value. On the other hand, when the gain constant control is performed, the angle of the mirror 7a is adjusted so that the gain (optical output monitor value (mV)/optical input monitor value (mV)) becomes a target value, and thereafter a mirror angle is fixed.

Figure 14:
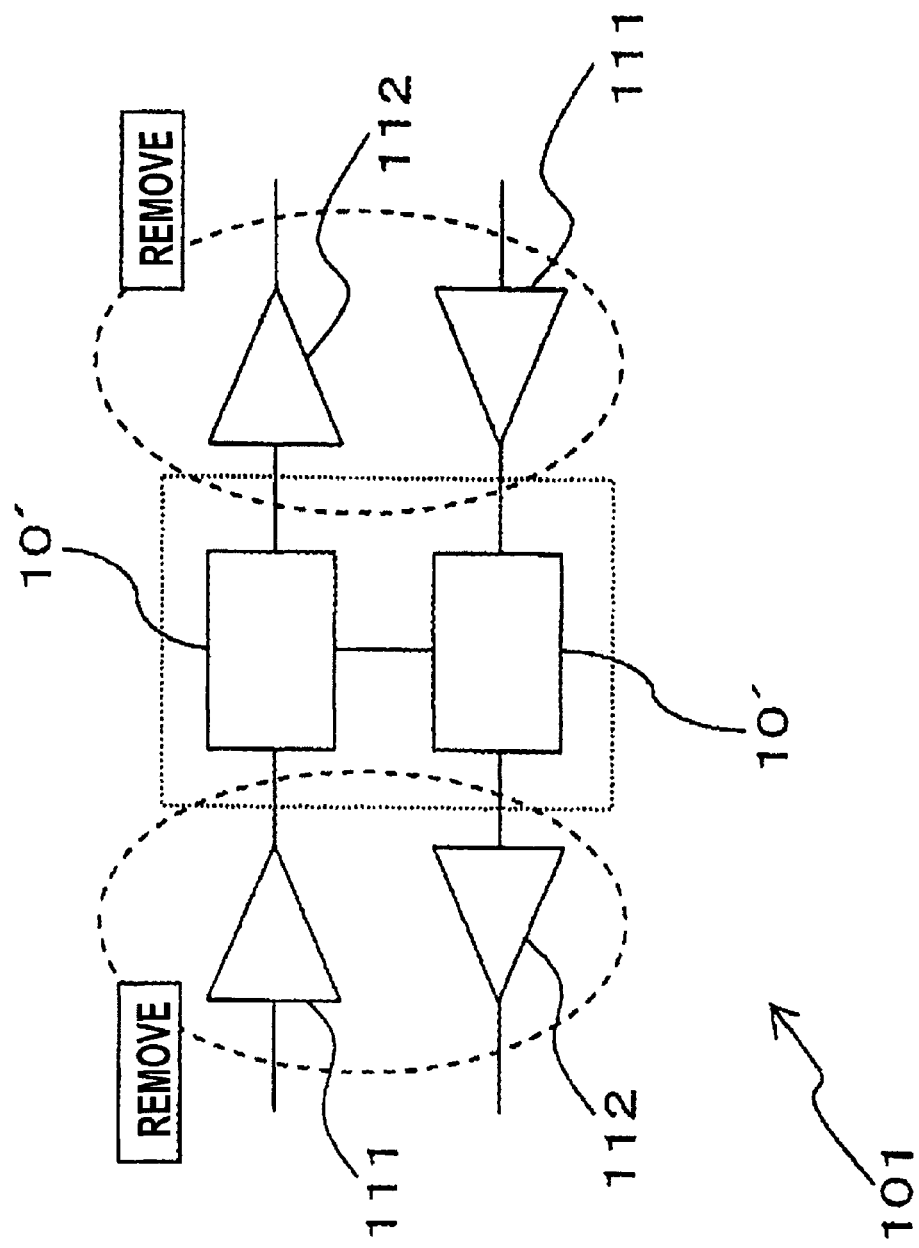
FIG. 14 is a diagram showing a modification of the present embodiment.

In the wavelength selective switches 1 and 10 in such first and second embodiments, the application of the wavelength selective switch using, as a constituent component, the optical waveguide device having a function as an optical amplifier at the same time, to the node 101 of the above-described optical network 100 shown in FIG. 6, as a wavelength selective switch 10', makes it possible to omit the construction as the optical amplifiers 111 and 112 provided at pre-stages and post-stages of the wavelength selective switches 10' as shown in FIG. 14 for example, to thereby achieve a cost-reduction.

Figure 15:
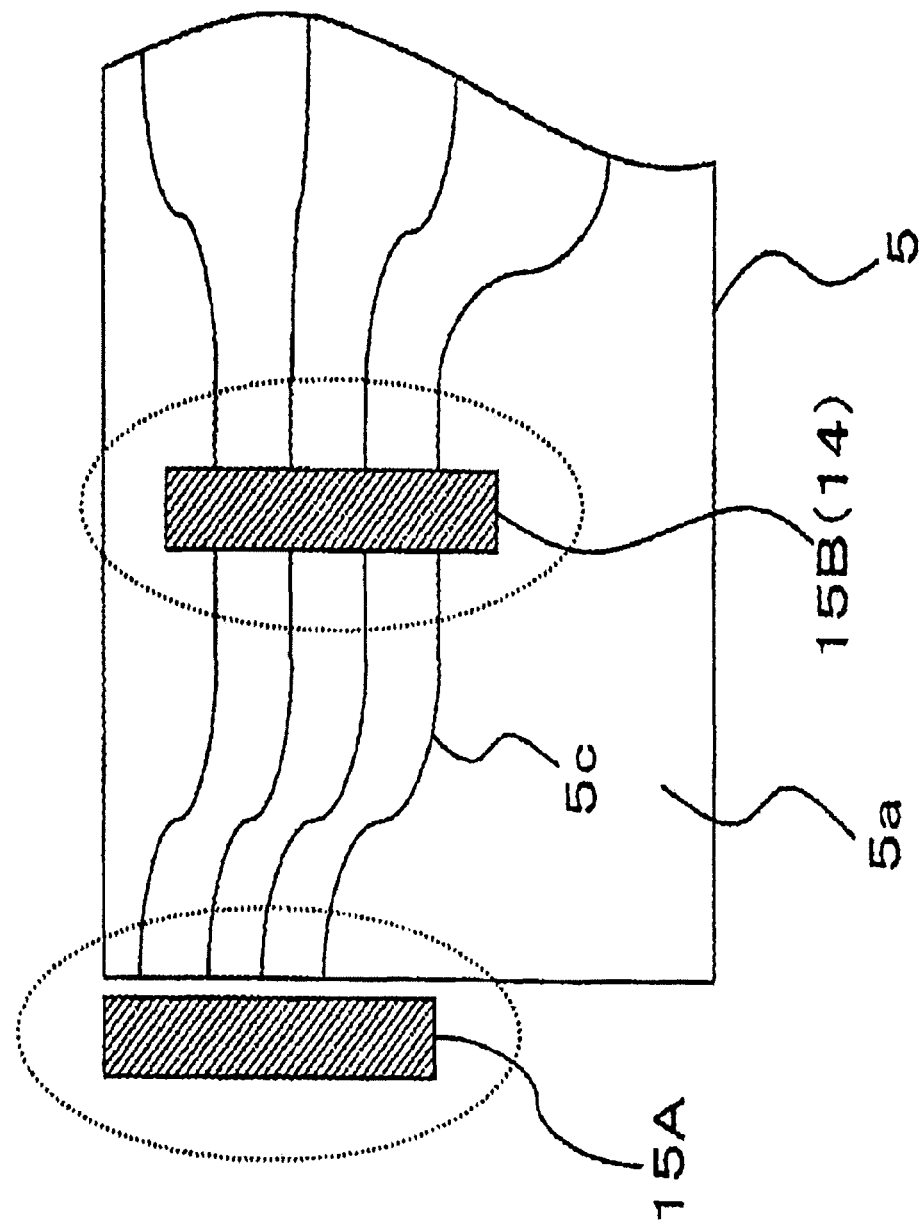
FIG. 15 is a diagram showing a modification of the present embodiment.
Figure 16:
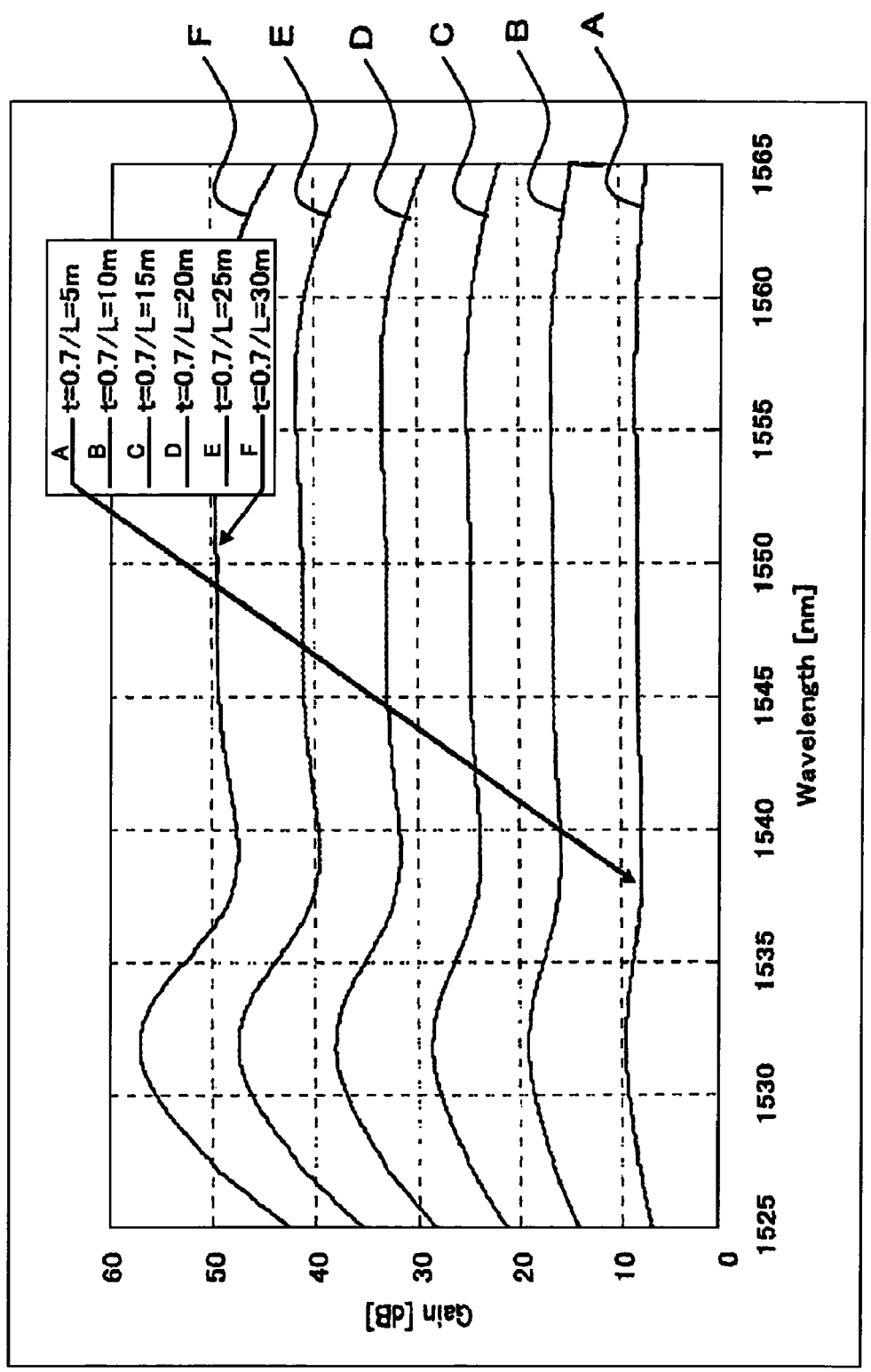
FIG. 16 is a diagram for explaining a modification of the present embodiment.

In the optical waveguide device 5 in the above-described first embodiment, as shown in FIG. 15, an optical filter 15A for flattening gain wavelength characteristic may be interposed between the correction waveguide 5c and the mirror 7a. Alternatively, in the optical waveguide device 5 in the above-described first embodiment, as shown in FIG. 13A or 13B, it is possible to form the depression region 14 and in addition, to mount an optical filter 15B as describe above, into the depression region 14.

For the optical filters 15A and 15B, EDFs (erbium doped fibers) with property for flattening gain wavelength characteristic can be applied, as illustrated in FIGS. 16A to 16F for example. This allows gain deviation that presents a problem in the optical amplifiers 111 and 112 to be suppressed in the wavelength selective switch. Here, FIGS. 16A to 16F show characteristics in the case where the EDF length L is varied, with the inverted population ratio t set at 0.7.

Figure 17A:
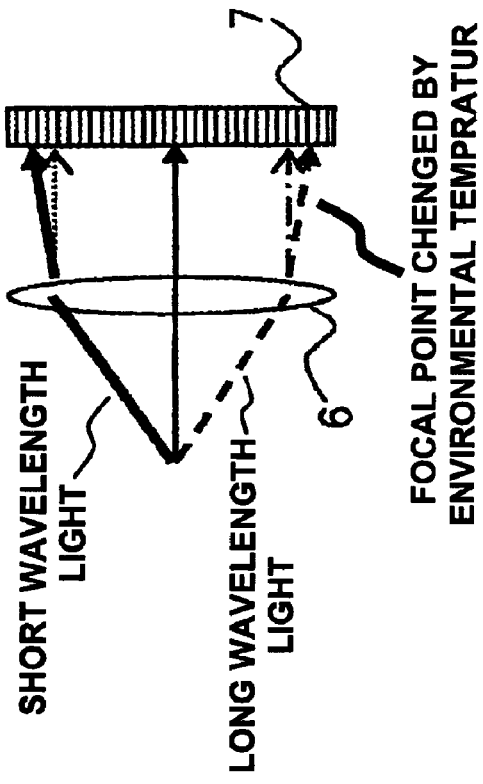
FIGS. 17A and 17B are diagrams each explaining a modification of the present embodiment.
Figure 17B:
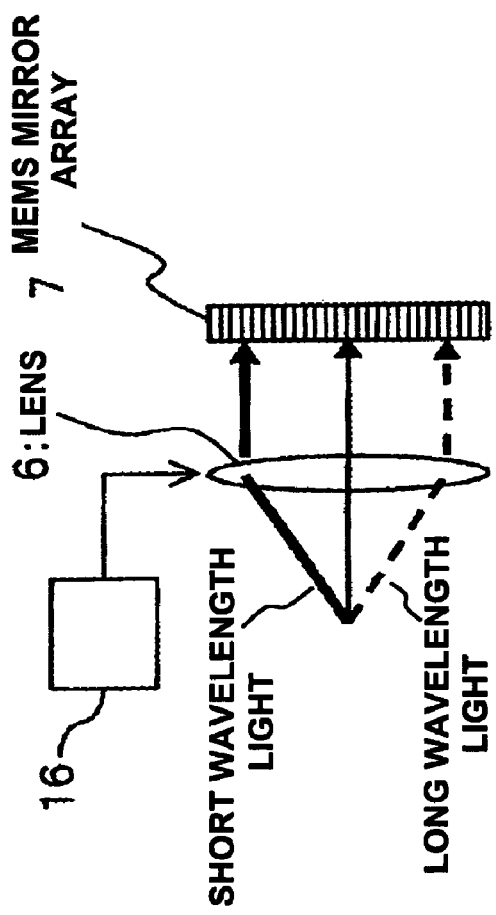

In each of the wavelength selective switches 1 and 10 according to the above-described embodiments, optical members (refer to symbols 5, 5A, 5B, 6, 7, 9) serving as constituent components may be further equipped with a temperature adjustment control function as appropriate. When the wavelength selective switch 1 or 10 is applied in an environment in which temperature fluctuation is relatively large, the focal position deviates due to temperature changes, as shown in FIG. 17B, and it is also supposed that the intervals between light beams having respective wavelengths, made incident on the mirrors 7a may not correspond to the installation intervals of the mirrors 7a. With this being the case, by mounting the temperature adjustment control function to the optical members as appropriate (for example, as shown in FIG. 17A, by mounting the temperature adjustment control unit 16 for performing temperature adjustment with respect to the condensing lens 6), the variation characteristic of the focal position depending on temperature can be cancelled, thereby enabling a desired reflection characteristic to be achieved.

Figure 18A:
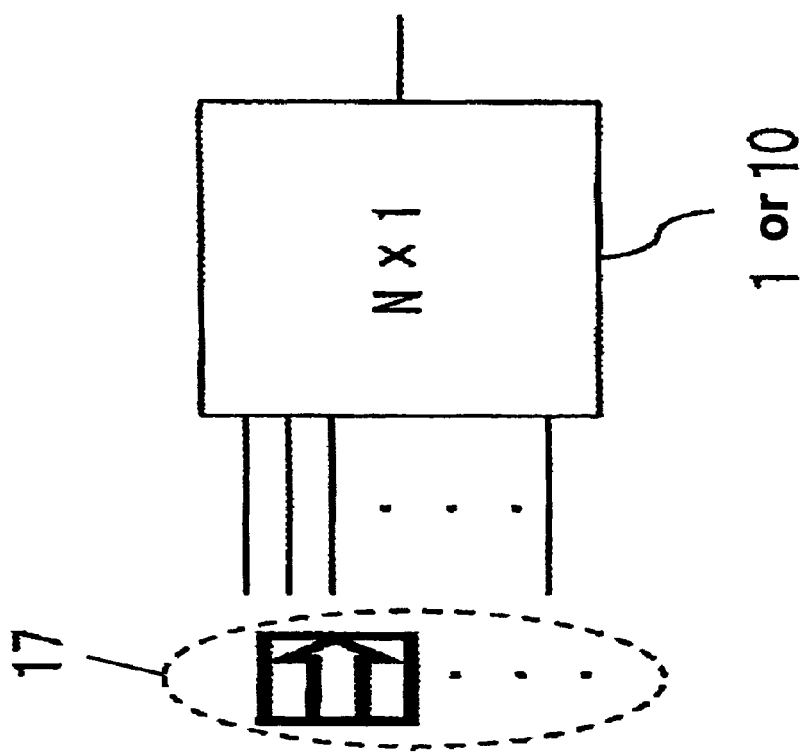
FIGS. 18A and 18B are diagrams each showing a modification of the present embodiment.
Figure 18B:
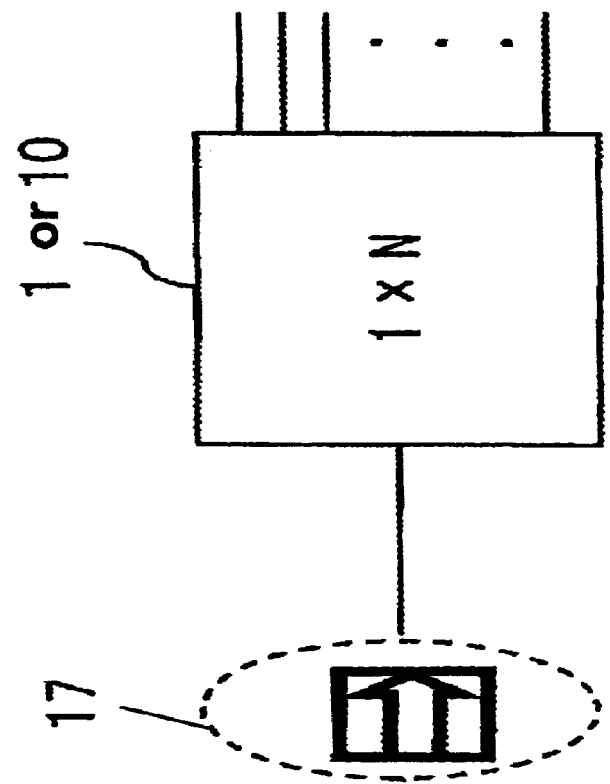

Furthermore, as shown in FIGS. 18A and 18B, by interposing an optical isolator between the optical fibers 8a constituting optical ports, crosstalk between ports can be inhibited. FIG. 18A shows the case where an optical isolator 17 is provided to input optical ports of a 1×N wavelength selective switch 1 (10), and FIG. 18B shows the case where the optical isolator 17 is provided to input optical ports of an N×1 wavelength selective switch 1 (10).

As described above, according to the embodiments, since focus images by the mirrors can be optimized by such a simple construction with mirror interfaces, advantages in preventing the deterioration of pass bands, and in turn preventing the occurrence of variations in pass bands for each channel are brought about.

The turn of the embodiments isn't a showing the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An optical device, comprising:
   a mirror device having a plurality of mirrors which are able to move, the mirrors being equidistantly arranged and reflecting input light; and
   a mirror interface configured to adjust a light axis of each input light in accordance with each position of the mirrors, the mirror interface including a substrate and a plurality of optical waveguides formed on the substrate, the plurality of optical waveguides adjusting the light axis of the each input light in accordance with each position of the mirrors.

2. The optical device of the claim 1, further comprising:
   optical ports into which light is inputted or from which light is outputted; and
   a spectroscope to which the outputted light from the optical ports is inputted, the spectroscope dispersing the outputted light corresponding to each wavelength and outputting the dispersed light to the mirror interface.

3. The optical device of the claim 2, wherein the spectroscope is an arrayed waveguide gratings.

4. The optical device of the claim 2:
   wherein the spectroscope includes a plurality of arrayed waveguide gratings arranged so as to correspond to the ports on the substrate, the arrayed waveguide gratings having a plurality of output waveguides, each of the output waveguides propagating the light dispersed corresponding to the wavelength; and
   wherein the mirror interface has a plurality of waveguides connected with the respective output waveguides of the arrayed waveguide gratings, the waveguides including a portion configured to arrange at output portions of the output waveguides.

5. The optical device of the claim 4, wherein the mirror interface has monitors corresponding to each of the waveguides.

6. The optical device of the claim 5 further comprising a controller configured to control the output portions of the output waveguides based on outputs of the mirrors.

7. The optical device of the claim 2, wherein the arrayed waveguide gratings and the mirror interface are formed on the same substrate.

* * * * *